(12) United States Patent
Nazarian

(10) Patent No.: US 12,100,449 B1
(45) Date of Patent: Sep. 24, 2024

(54) DIFFERENTIAL PROGRAMMING OF TWO-TERMINAL RESISTIVE SWITCHING MEMORY WITH INTRINSIC ERROR SUPPRESSION

(71) Applicant: Crossbar, Inc., Santa Clara, CA (US)

(72) Inventor: Hagop Nazarian, San Jose, CA (US)

(73) Assignee: Crossbar, Inc., Santa Clara, CA (US)

( * ) Notice: Subject to any disclaimer, the term of this patent is extended or adjusted under 35 U.S.C. 154(b) by 313 days.

(21) Appl. No.: 17/710,809

(22) Filed: Mar. 31, 2022

(51) Int. Cl.
*G11C 16/34* (2006.01)
*G11C 13/00* (2006.01)
*H04L 9/32* (2006.01)

(52) U.S. Cl.
CPC ...... *G11C 13/0069* (2013.01); *G11C 13/0059* (2013.01); *H04L 9/3278* (2013.01); *G11C 2013/0078* (2013.01)

(58) Field of Classification Search
CPC ............ G11C 16/3445; G11C 16/3418; G11C 11/5678; G11C 13/004; G11C 13/0069; G11C 16/16; G11C 16/26
See application file for complete search history.

(56) References Cited

U.S. PATENT DOCUMENTS

| | | |
|---|---|---|
| 7,006,373 B2 | 2/2006 | Hidaka |
| 7,672,155 B2 | 3/2010 | Kim et al. |
| 9,520,173 B1 | 12/2016 | Baker, Jr. et al. |
| 10,692,575 B1 | 6/2020 | Huang |
| 2007/0058425 A1 | 3/2007 | Cho et al. |
| 2007/0247940 A1 | 10/2007 | Liaw et al. |
| 2008/0137436 A1* | 6/2008 | Salter ................. G11C 16/3418 365/201 |
| 2011/0299340 A1 | 12/2011 | Samachisa et al. |
| 2014/0321193 A1 | 10/2014 | Park |
| 2016/0133325 A1 | 5/2016 | Lan et al. |

(Continued)

FOREIGN PATENT DOCUMENTS

CN 114187945 A 3/2022

OTHER PUBLICATIONS

Ex Parte Quayle action for U.S. Appl. No. 17/710,858, dated Jan. 31, 2024, Oct. 3, 2023, 8 pages long.

(Continued)

*Primary Examiner* — Jason Lappas
(74) *Attorney, Agent, or Firm* — Wegman Hessler Valore

(57) ABSTRACT

Embodiments of the present disclosure provide intrinsic program suppression of a non-programmed two-terminal resistive switching memory cell of a plurality of memory cells defining an identifier bit, such as a physical unclonable feature (PUF) bit. Differential programming applies a program signal to a plurality of resistive switching memory cells and derives a value for the identifier bit from which cell(s) becomes programmed. However, where more than an expected number of cells become programmed, an invalid value can occur. Disclosed intrinsic program suppression mitigates or avoids the invalid result by very rapidly reducing the program signal to a non-programmed cell(s) in response to another cell(s) becoming programmed. In an embodiment, intrinsic program suppression can be implemented by programming the plurality of memory cells electrically in parallel and shorting second terminals of the plurality of memory cells at a common node.

20 Claims, 14 Drawing Sheets

(56) References Cited

U.S. PATENT DOCUMENTS

| | | | |
|---|---|---|---|
| 2016/0284403 | A1 | 9/2016 | Navon et al. |
| 2019/0287612 | A1 | 9/2019 | Zheng-Jun et al. |
| 2019/0341107 | A1 | 11/2019 | Bertin |
| 2021/0201997 | A1 | 7/2021 | Yuh et al. |
| 2022/0036949 | A1 | 2/2022 | Asnaashari et al. |
| 2022/0084592 | A1 | 3/2022 | Tamara |
| 2022/0375536 | A1 | 11/2022 | Strachan et al. |
| 2023/0138195 | A1 | 5/2023 | Park et al. |

OTHER PUBLICATIONS

Notice of Allowance for U.S. Appl. No. 17/710,858, dated Jan. 31, 2024, 8 pages long.
International Search Report and Written Opinion for International Application No. PCT/US2023/065178 dated Jul. 24, 2023, 7 pages.
Notice of Allowance for U.S. Appl. No. 17/710,835 dated Oct. 18, 2023, 8 pages long.
Notice of Allowance for U.S. Appl. No. 17/710,835, dated Apr. 9, 2024, 10 pages long.
Office Action for U.S. Appl. No. 17/895,129, dated Apr. 26, 2024, 16 pages long.

\* cited by examiner

DIFFERENTIAL PROGRAMMING OF TWO-TERMINAL RESISTIVE SWITCHING MEMORY WITH INTRINSIC ERROR SUPPRESSION

INCORPORATION BY REFERENCE

U.S. patent application Ser. No. 17/708,491 filed Mar. 30, 2022 and titled "DYNAMIC HOST ALLOCATION OF PHYSICAL UNCLONABLE FEATURE OPERATION FOR RESISTIVE SWITCHING MEMORY", and U.S. patent application Ser. No. 17/223,817 filed Apr. 6, 2021 and titled "DISTINCT CHIP IDENTIFIER SEQUENCE UTILIZING UNCLONABLE CHARACTERISTICS OF RESISTIVE MEMORY ON A CHIP" are hereby incorporated by reference herein in their respective entireties and for all purposes.

TECHNICAL FIELD

The subject disclosure relates generally to two-terminal resistive switching memory, and as one illustrative example, differential programming of two-terminal resistive switching memory with intrinsic suppression of non-program cells.

BACKGROUND

Resistive-switching memory represents a recent innovation within the field of integrated circuit technology. While much of resistive-switching memory technology is in the development stage, various technological concepts for resistive-switching memory have been demonstrated and are in one or more stages of verification to prove or disprove associated theories or techniques. Resistive-switching memory technology is expected to show compelling evidence of substantial advantages over competing technologies in the semiconductor electronics industry in the near future.

Proposals for practical utilization of resistive-switching technology to memory applications for electronic devices have been put forth. For instance, resistive-switching elements are often theorized as viable alternatives, at least in part, to metal-oxide semiconductor (MOS) type memory transistors employed for electronic storage of digital information. Models of resistive-switching memory devices provide some potential technical advantages over non-volatile FLASH MOS type transistors, for instance.

In additional to memory elements, volatile resistive-switching elements have been proposed in conjunction with a MOS transistor for a high speed non-volatile memory device, or as a high-speed field actuated switch, or selector device. Still further, stochastic characteristics of resistive-switching structures have been proposed by the inventor as suitable for generating non-correlated data for random number generation, or similar applications. Each of these applications has met different needs for electronic memory applications or specialty data generation applications.

In light of the above, the Assignee of the present disclosure continues to develop and pursue practical utilizations of resistive-switching technology.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Embodiments of the present disclosure provide improved programming of two-terminal resistive switching memory cells. In some embodiments, a plurality of resistive switching memory cells can be aggregated to define a bit having desirable non-correlation characteristics (e.g., high randomness) with other similarly defined bits formed of different pluralities of resistive switching memory cells. Such a bit is referred to herein as an identifier bit derived largely from its functional capability to generate unique (and thus distinctly identifiable) data sequences. Identifier bits can include physical unclonable feature (PUF) bits (or physical unclonable function: also PUF bits), as well as random number generation (RNG) bits generated from non-native PUF processes or non-PUF processes, as described in more detail throughout this specification. In various disclosed embodiments, improved programming of two-terminal resistive switching memory cells can be implemented for an identifier bit defined by multiple resistive switching memory cells. In at least one embodiment, programming of multiple memory cells can involve electrically shorting second terminals of the respective cells at a common node to facilitate intrinsic inhibition of a second memory cell following a first memory cell becoming programmed.

In an embodiment, disclosed is a method for generating an identifier bit defined by a plurality of resistive switching memory cells. The method can comprise defining a plurality of memory cells as an identifier bit and coupling respective first electrodes of the plurality of memory cells to a common voltage source. Additionally, the method can comprise electrically shorting respective second electrodes of the plurality of memory cells to a shared node, and concurrently applying a program signal having a voltage magnitude and a cycle duration from the common voltage source across the respective first electrodes of the plurality of memory cells and applying low voltage, or ground, to the shared node. Still further, the method can comprise terminating the program signal.

In another embodiment(s), disclosed is a method of programming a bit defined by a pair of two-terminal resistive memory cells. The method can comprise clamping respective electrodes of the pair of two-terminal resistive memory cells to a voltage source. Further, the method can comprise shorting respective second electrodes of the pair of two-terminal resistive memory cells at a common node. In addition, the method can comprise initiating a program voltage at the voltage source and connecting the common node to a low voltage. Moreover, the method can comprise causing a first memory cell of the pair or two-terminal resistive memory cells to program to a low resistance state, and terminating the program voltage.

Still further embodiments of the present disclosure provide a memory device. The memory device can comprise an array of two-terminal resistive switching devices comprising a first switching device connected at a first terminal to a first bitline and a second switching device connected at a second terminal to a second bitline. Further, the memory device can comprise a voltage source, and a switch for selectively electrically connecting the first bitline and the second bitline in common to the voltage source. In addition to the foregoing, the memory device can comprise a common node selectively connectable to a second terminal of the first switching device and to a second terminal of the second switching device, and a second switch configured to selectively couple the common node to low voltage, or ground. Still further, the memory device can comprise a trim memory storing a differential program protocol for programming a bit defined by a combination of the first switching device and the second switching device.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

DETAILED DESCRIPTION

Introduction

Figure 1:
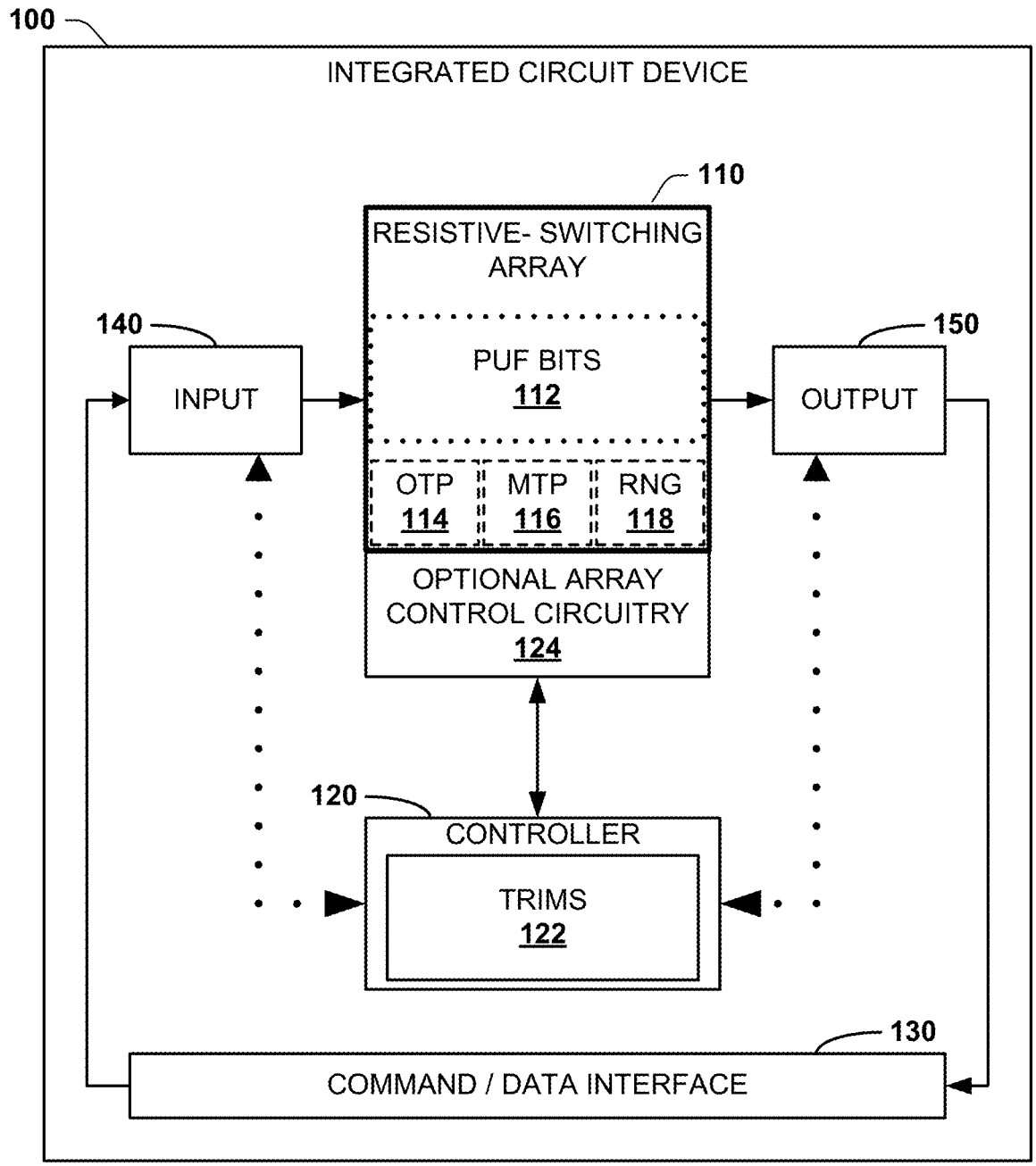
FIG. 1 depicts a block diagram of an example electronic device and an array of resistive switching devices having configurable characteristics, in disclosed embodiments.

One or more embodiments of the present disclosure leverage stochastic or substantially stochastic physical characteristics of nano-scale resistive switching devices to generate data. Being generally random, stochastic features of resistive switching devices can be leveraged to produce data that has little to no correlation among a population of such devices. As a result, that data can be suited to applications requiring distinct or unique identification, such as identification and authorization applications pertaining to a device (e.g., a semiconductor die—also referred to herein as a semiconductor chip—or a semiconductor wafer, group(s) of dies, group(s) of wafers, an electronic device incorporating a semiconductor die(s), and so forth). Further, highly non-correlated data can also be utilized for security applications, such as random number generation, cryptography key generation applications, and the like.

In addition, various embodiments disclose resistive switching device processes utilized to generate high-entropic data sequences that meet or exceed scientific standards for randomness, and are comparable with high-quality cryptographic random number sources. Moreover, the switching device processes utilized to generate data sequences can be selected from native resistive switching devices (e.g., devices that have not previously been programmed, and are original or virgin devices post-fabrication) that most closely leverage nano-scale unclonable physical characteristics of the resistive switching devices. This achieves high non-correlation among devices on a die (intra-die), among dies on a wafer (inter-die) and among wafers in a fabrication facility, minimizing likelihood that a data sequence generated from resistive switching devices on a single die is repeated by other devices on that same die, or repeated by other resistive switching devices on a given wafer, or on different wafers, and so forth.

Stochastic physical characteristics can also be referred to as physical unclonable functions (PUF), physically unclonable features (also PUF), physical(ly) unclonable features, or other suitable nomenclature. Data derived from such stochastic physical characteristics are referred to herein as PUF data (or a PUF bit, or group of PUF bits, etc.) and generally involve a resistive switching cell process applied to one or more resistive switching cells that define a PUF bit(s) (e.g., see U.S. patent application Ser. No. 17/223,817 filed Apr. 6, 2021, incorporated by reference hereinabove). PUF data can be generated from a cell process(es) applied to native resistive switching memory cells (sometimes referred to as virgin resistive switching memory cells) that have not had a memory process previously applied to those memory cells, following manufacture. Example memory processes can include a forming process (e.g., comprising one or more electrical forming pulses), a program process (e.g., comprising one or more electrical program pulses), an erase process (e.g., comprising one or more electrical erase pulses), an overwrite process, and so forth. In addition, PUF data generated from non-volatile resistive switching memory cells can thereafter be stored and read from at least a subset of the non-volatile resistive switching memory cells utilized to generate the PUF data.

In one or more additional embodiments, some disclosed sequence generation processes can be rendered permanent through one-time programmable processes, allowing a sequence to be reliably re-read over a very large number of read cycles to reliably and accurately reproduce a previously generated data sequence, achieving extremely low bit error rates. In still further embodiments, disclosed processes for generating non-correlated data sequences can involve processes compatible with resistive switching device operation, allowing a set of resistive switching devices to be selected post-fabrication from any suitable subset of resistive switching devices on a chip. Systems and methods are further provided to export control of resistive switching device selection, data sequence process selection and process configuration—associated with physically unclonable data sequence generation disclosed herein—to a user of the chip post-fabrication. Various other embodiments will be readily apparent based on the disclosure herein and the associated drawings.

As utilized herein, the term "substantially" and other relative terms or terms of degree (e.g., about, approximately, substantially, and so forth) are intended to have the meaning specified explicitly in conjunction with their use herein, or a meaning which can be reasonably inferred by one of ordinary skill in the art, or a reasonable variation of a specified quality(ies) or quantity(ies) that would be understood by one of ordinary skill in the art by reference to this entire specification (including the knowledge of one of ordinary skill in the art as well as material incorporated by reference herein). As an example, a term of degree could refer to reasonable manufacturing tolerances about which a specified quality or quantity could be realized with fabrication equipment. Thus, as a specific illustration, though non-limiting, for an element of a resistive switching device expressly identified as having a dimension of about 50 angstroms (A), the relative term "about" can mean reasonable variances about 50 A that one of ordinary skill in the art would anticipate the specified dimension of the element could be realized with commercial fabrication equipment, industrial fabrication equipment, laboratory fabrication equipment, or the like, and is not limited to a mathematically precise quantity (or quality). In other examples, a term of degree could mean a variance of +/−0-3%, +/−0-5%, or +/−0-10% of a expressly stated value, where suitable to one of ordinary skill in the art to achieve a stated function or feature of an element disclosed herein. In still other examples, a term of degree could mean any suitable variance in quality(ies) or quantity(ies) that would be suitable to accomplish an explicitly disclosed function(s) or feature(s) of a disclosed element. Accordingly, the subject specification is by no means limited only to specific qualities and quantities disclosed herein, but includes all variations of a specified quality(ies) or quantity(ies) reasonably conveyed to one of ordinary skill in the art by way of the context disclosed herein.

Integrated circuit techniques for fabricating resistive switching memory can cause physical properties having the stochastic or substantially stochastic characteristics desired for generating PUF data. For instance, these physical properties can have little or no replication or repetition among fabricated memory cells made by the same process. As one example, one or more layers of a disclosed resistive switching device can have a root mean square (RMS) surface roughness of >0.2 nm, up to a maximum of about 10.0 nm surface roughness, in an embodiment. This results in random or near-random variation in layer thickness, including unpredictable changes in physical characteristics of such devices. In some theoretical models the RMS surface roughness can affect the geometry of a resistive switching material layer inducing stochastic or substantially stochastic variations in resistive switching devices properties such as: native or virgin (e.g., as fabricated) current conductance, program voltage, differential program voltage, program speed, differential program speed, among others disclosed throughout this specification. As further examples, different resistive-switching memory cells and cell technologies can have different discrete programmable resistances, different associated program/erase voltages, as well as other differentiating characteristics. In an embodiment, a resistive switching memory device resulting from a 28 nm photolithographic process with device size between about 50 nanometer (nm) width and about 130 nm width (e.g., about 100 nm width, about 56 nm width, about 75 nm width, about 128 nm width, and so forth) can be suitable to achieve stochastic physical characteristics disclosed herein. In other embodiments, a 22 nm photolithographic process producing a device size between 40 nm and 100 nm width (e.g., about 44 nm width, about 60 nm width, about 66 nm width, about 88 nm width, and so forth) can achieve stochastic physical characteristics.

In addition to the foregoing, stochastic physical features of resistive switching devices can vary among devices in a die and among devices on a wafer or multiple wafers. As a result, minimal correlation in the native physical features among devices, dies, wafers and so forth, can yield minimal correlation between operational processes and data derived from such processes among devices, dies, wafers and the like. For instance, a native electrical resistance of a resistive switching layer (RSL) can depend at least in part on these non-correlated physical features and can vary from device to device even for adjacent devices in a single array on a single die (and, as previously stated, among multiple dies, wafers, and so on). Further, a current flow through the RSL in a native un-programmed state, a program voltage in the native un-programmed state, a program speed in the native un-programmed state, differential program voltage/current/speed in the native un-programmed state, and so on, can vary among resistive switching devices. Processes disclosed herein for forming resistive switching devices and for leveraging stochastic or substantially stochastic physically unclonable features of resistive switching devices can provide excellent non-correlated data sequences.

As utilized herein, the term "native", "original", "virgin" or the like refers to post-fabrication but pre-commercial operation of resistive switching devices on a semiconductor die. Native (and like terminology) need not exclude some or all post-fabrication operations such as quality testing or other verification routines performed by a manufacturer, and even some pre-commercial operation by a non-manufacturer such as testing to ensure manufacturer quality specifications are met by a chip, chip setup routines or configuration routines (e.g., defining one-time programmable memory or identifier memory within an array of resistive switching memory; see e.g., FIG. 1, infra), among others. In general, a resistive switching device is in a native state, as utilized herein, if it has not yet received a stimulus (e.g., electrical, thermal, magnetic, or a like stimulus known in the art, suitable combinations thereof, and so forth) suitable to form a conductive filament within the resistive switching device and change the resistive switching device from an electrically resistive state to an electrically conductive state as described herein or known in the art.

As the name implies, a two-terminal resistive switching device has two terminals or electrodes. Herein, the terms "electrode" and "terminal" are used interchangeably; moreover, a two-terminal resistive switching device includes a non-volatile two-terminal memory device as well as a volatile two-terminal switching device. Generally, a first electrode of a two-terminal resistive switching device is referred to as a "top electrode" (TE) and a second electrode of the two-terminal resistive switching device is referred to as a "bottom electrode" (BE), although it is understood that electrodes of two-terminal resistive switching devices can be according to any suitable arrangement, including a horizontal arrangement in which components of a memory cell are (substantially) side-by-side rather than overlying one another. Between the TE and BE of a two-terminal resistive switching device is typically an interface layer sometimes referred to as a switching layer, a resistive switching medium (RSM) or a resistive switching layer (RSL); such devices are not limited to these layers, however, as one or more barrier layer(s), adhesion layer(s), ion conduction layer(s), seed layer(s), particle source layer(s) or the like—as disclosed herein, disclosed within a publication incorporated by reference herein, as generally understood and utilized in the art or reasonably conveyed to one of ordinary skill in the art by way of the context provided herein and its addition to the general understanding in the art or the incorporated publications—may be included between or adjacent one or more of the TE, the BE or the interface layer consistent with suitable operation of such device.

Composition of memory cells, generally speaking, can vary per device with different components, materials or deposition processes selected to achieve desired characteristics (e.g., stoichiometry/non-stoichiometry, volatility/non-volatility, on/off current ratio, switching time, read time, memory durability, program/erase cycle, and so on). One example of a filamentary-based device can comprise: a conductive layer, e.g., metal, metal-alloy, metal-nitride, (e.g., comprising TiN, TaN, TiW, or other suitable metal compounds), an optional interface layer (e.g., doped p-type (or n-type) silicon (Si) bearing layer (e.g., a p-type or n-type Si bearing layer, p-type or n-type polysilicon, p-type or n-type polycrystalline SiGe, etc.)), a resistive switching layer (RSL) and an active metal-containing layer capable of being ionized. Under suitable conditions, the active metal-containing layer can provide filament-forming ions to the RSL. In such embodiments, a conductive filament (e.g., formed by the ions) can facilitate electrical conductivity through at least a subset of the RSL, and a resistance of the filament-based device can be determined, as one example, by a tunneling resistance between the filament and the conductive layer. A memory cell having such characteristics may be described as a filamentary-based device.

A RSL (which can also be referred to in the art as a resistive switching media (RSM)) can comprise, e.g., an undoped amorphous Si-containing layer, a semiconductor layer having intrinsic characteristics, a stoichiometric or non-stoichiometric silicon nitride (e.g., SiN, $Si_3N_4$, SiNx, etc.), a Si sub-oxide (e.g., $SiO_x$ wherein x has a value between 0.1 and 2), a Si sub-nitride, a metal oxide, a metal nitride, a non-stoichiometric silicon compound, and so forth. Other examples of materials suitable for the RSL could include $Si_xGe_yO_z$ (where x, y and z are respective suitable positive numbers), a silicon oxide (e.g., SiON, where N is a suitable positive number), a silicon oxynitride, an undoped amorphous Si (a-Si), amorphous SiGe (a-SiGe), $TaO_B$ (where B is a suitable positive number), $HfO_C$ (where C is a suitable positive number), $TiO_D$ (where D is a suitable number), $Al_2O_E$ (where E is a suitable positive number) and so forth, a nitride (e.g., AlN, SiN), or a suitable combination thereof.

In some embodiments, a RSL employed as part of a non-volatile memory device (non-volatile RSL) can include a relatively large number (e.g., compared to a volatile selector device) of material voids or defects to trap neutral metal particles (e.g., at low voltage) within the RSL. The large number of voids or defects can facilitate formation of a thick, stable structure of the neutral metal particles. In such a structure, these trapped particles can maintain the non-volatile memory device in a low resistance state in the absence of an external stimulus (e.g., electrical power), thereby achieving non-volatile operation. In other embodiments, a RSL employed for a volatile selector device (volatile RSL) can have very few material voids or defects for trapping particles. Because of the few particle-trapping voids/defects, a conductive filament formed in such an RSL can be quite thin (e.g., one to a few particles wide depending on field strength, particle material or RSL material, or a suitable combination of the foregoing), and unstable absent a suitably high external stimulus (e.g., an electric field, voltage, current, joule heating, or a suitable combination thereof). Moreover, the particles can be selected to have high surface energy, and good diffusivity within the RSL. This leads to a conductive filament that can form rapidly in response to a suitable stimulus, but also deform quite readily, e.g., in response to the external stimulus dropping below a deformation magnitude (which can be lower than a formation magnitude of the external stimulus associated with forming the volatile conductive filament, e.g., in response to a current flowing through the selector device; see U.S. Pat. No. 9,633,724 B2 hereby incorporated by reference herein in its entirety and for all purposes). Note that a volatile RSL and conductive filament for the selector device can have different electrical characteristics than a conductive filament and non-volatile RSL for the non-volatile memory device. For instance, the selector device RSL can have higher material electrical resistance, and can have higher on/off current ratio, among others.

An active metal-containing layer for a filamentary-based memory cell can include, among others: silver (Ag), gold (Au), titanium (Ti), titanium-nitride (TiN) or other suitable compounds of titanium, nickel (Ni), copper (Cu), aluminum (Al), chromium (Cr), tantalum (Ta), iron (Fe), manganese (Mn), tungsten (W), vanadium (V), cobalt (Co), platinum (Pt), hafnium (Hf), and palladium (Pd). Other suitable conductive materials, as well as stoichiometric or non-stoichiometric: compounds, nitrides, oxides, alloys, mixtures or combinations of the foregoing or similar materials can be employed for the active metal-containing layer in some aspects of the subject disclosure. Further, a non-stoichiometric compound, such as a non-stoichiometric metal oxide/metal-oxygen or metal nitride/metal nitrogen (e.g., $AlO_x$, $AlN_x$, $CuO_x$, $CuN_x$, $AgO_x$, $AgN_x$, and so forth, where x is a suitable positive number or range of numbers, such as: 0<x<2, 0<x<3, 0<x<4 or other number/range of numbers depending on metal compound, which can have differing values for differing ones of the non-stoichiometric compounds) or other suitable metal compound can be employed for the active metal-containing layer, in at least one embodiment.

In one or more embodiments, a disclosed filamentary resistive switching device can include an active metal layer comprising a metal-nitrogen selected from the group consisting of: $TiN_x$, $TaN_y$, $AlN_x$, $CuN_x$, $WN_x$ and $AgN_x$, where x is a positive number (or range of numbers) that can vary per metal-nitrogen material. In a further embodiment(s), the active metal layer can comprise a metal-oxygen selected from the group consisting of: $TiO_x$, $TaO_x$, $AlO_x$, $CuO_x$, $WO_x$ and $AgO_x$ where x is a positive number (or range of numbers) that can likewise vary per metal-oxygen material. In yet another embodiment(s), the active metal layer can comprise a metal oxygen-nitrogen selected from the group consisting of: $TiO_aN_b$, $AlO_aN_b$, $CuO_aN_b$, $WO_aN_b$ and $AgO_aN_b$, where a and b are suitable positive numbers/ranges of numbers. The disclosed filamentary resistive switching device can further comprise a switching layer comprising a switching material selected from the group consisting of: $SiO_y$, $AlN_y$, $TiO_y$, $TaO_y$, $AlO_y$, $CuO_y$, $TiN_x$, $TiN_y$, $TaN_x$, $TaN_y$, $SiO_x$, $SiN_y$, $AlN_x$, $CuN_x$, $CuN_y$, $AgN_x$, $AgN_y$, $TiO_x$, $TaO_x$, $AlO_x$, $CuO_x$, $AgO_x$, and $AgO_y$, where x and y are positive numbers (or ranges), and y is larger than x. Various combinations of the above are envisioned and contemplated within the scope of embodiments of the present invention.

In one example, a disclosed filamentary resistive switching device comprises a particle donor layer (e.g., the active metal-containing layer) comprising a stoichiometric or non-stoichiometric metal compound (or mixture) and a resistive switching layer. In one alternative embodiment of this example, the particle donor layer comprises a metal-nitrogen: $MN_x$, e.g., $AgN_x$, $TiN_x$, $AlN_x$, etc., and the resistive switching layer comprises a metal-nitrogen: $MN_y$, e.g., $AgO_y$, $TiO_y$, $AlO_y$, and so forth, where y and x are positive numbers (or ranges), and in some cases y is larger than x. In an alternative embodiment of this example, the particle donor layer comprises a metal-oxygen: $MO_x$, e.g., $AgO_x$, $TiO_x$, $AlO_x$, and so on, and the resistive switching layer comprises a metal-oxygen: $MO_y$, e.g., $AgO_y$, $TiO_y$, $AlO_y$, or the like, where y and x are positive numbers (or ranges), and in some cases y is larger than x. In yet another alternative, the metal compound of the particle donor layer is a $MN_x$ (e.g., $AgN_x$, $TiN_x$, $AlN_x$, etc.), and the resistive switching layer is selected from a group consisting of MO, (e.g., $AgO_y$, $TiO_y$, $AlO_y$, etc.) and $SiO_y$, where x and y are typically non-stoichiometric values, or vice versa in a still further embodiment.

As utilized herein, variables x, y, a, b, and so forth representative of values or ratios of one element with respect to another (or others) in a compound or mixture can have different values (or ranges) suitable for respective compounds/mixtures, and are not intended to denote a same or similar value or ratio among the compounds. Mixtures can refer to non-stoichiometric materials with free elements therein—such as metal-rich nitride or oxide (metal-oxide/nitride with free metal atoms), metal-poor nitride or oxide (metal-oxide/nitride with free oxygen/nitrogen atoms)—as well as other combinations of elements that do not form traditional stoichiometric compounds as understood in the art. Some details pertaining to embodiments of the subject disclosure can be found in the following U.S. patent applications that are licensed to the assignee of the present application for patent: application Ser. No. 11/875,541 filed Oct. 19, 2007 and application Ser. No. 12/575,921 filed Oct. 8, 2009; each of the foregoing patent applications are hereby incorporated by reference herein in their respective entireties and for all purposes in addition to those incorporated by reference elsewhere herein.

Some embodiments of the subject disclosure can employ a bipolar switching device that exhibits a first switching response (e.g., programming to one of a set of program states) to an electrical signal of a first polarity and a second switching response (e.g., erasing to an erase state) to the electrical signal having a second polarity. The bipolar switching device is contrasted, for instance, with a unipolar device that exhibits both the first switching response (e.g., programming) and the second switching response (e.g., erasing) in response to electrical signals having the same polarity and different magnitudes.

In some disclosed embodiments, completion of a conductive filament can involve only a few particles (e.g., atoms, ions, conductive compounds, etc.) of conductive material, or less. As one particular example, an electrically continuous conductive filament could be established by position of 1-3 atoms at a boundary of a switching layer, whereas repositioning of one or more of these atoms can break that electrical continuity, in some embodiments. Because the scale is so small between a completed filament and non-completed filament, illicit side-channel attempts to read bits of memory—for example through high intensity microscopy—can be very difficult, if not impossible due to the difficulty of imaging such small particles and determining whether their location is sufficient to establish electrical continuity. Still further, disclosed resistive switching devices can be formed among metal lines of a semiconductor chip (e.g., among backend-of-line wiring layers). The density of metal wiring layers further occludes visibility of the resistive switching devices, making common side-channel techniques unprofitable.

Following program or erase pulses, a read pulse can be asserted. This read pulse is typically lower in magnitude relative to program or erase pulses and typically insufficient to affect the conductive filament and/or change the state of the two-terminal memory cell. By applying a read pulse to one of the electrodes of the two-terminal memory, a measured current (e.g., Ion) when compared to a predetermined threshold current can be indicative of the conductive state of the two-terminal memory cell. The threshold current can be preset based on expected current values in different states (e.g., high resistance state current; respective currents of one or more low resistance states, and so forth) of the two-terminal memory device, suitable for a given two-terminal memory technology. For example, when the conductive filament has been formed (e.g., in response to application of a program pulse), the conductance of the cell is greater than otherwise and the measured current (e.g., Ion) reading in response to the read pulse will be greater. On the other hand, when the conductive filament is removed (e.g., in response to application of an erase pulse), the resistance of the cell is high because the interface layer has a relatively high electrical resistance, so the conductance of the cell is lower and the measured current (e.g., $I_{off}$) reading in response to the read pulse will be lower. By convention, when the conductive filament is formed, the memory cell is said to be in the "on-state" with a high conductance. When the conductive filament is not extant, the memory cell is said to be in the "off-state". A memory cell being in the on-state or the off-state can be logically mapped to binary values such as, e.g., "1" and "0". It is understood that conventions used herein associated with the state of the cell or the associated logical binary mapping are not intended to be limiting, as other conventions, including an opposite convention can be employed in connection with the disclosed subject matter. Techniques detailed herein are described and illustrated in connection with single-level cell (SLC) memory, but it is understood that the disclosed techniques can also be utilized for multi-level cell (MLC) memory in which a single memory cell can retain a set of measurably distinct states that represent multiple bits of information.

OVERVIEW

FIG. 1 illustrates a block diagram of an example integrated circuit device 100 for an electronic device according to one or more embodiments of the present disclosure. Integrated circuit device 100 includes an array(s) 110 of two-terminal resistive-switching memory cells. Array(s) 110 of memory can include resistive switching memory cells, and different portions of the resistive switching memory cells can be characterized (and re-characterized, where suitable) for different memory cell functions. Example memory cell functions can include physical identifier functions (e.g., physical unclonable feature (PUF), random number generation (RNG)), one-time programmable (OTP) functions and many-time programmable (MTP) functions (also referred to as rewritable or program/erase functions). Different groups of memory cells of array(s) 110 are provided (or can be characterized) to implement these functions. As described herein, identifier functions can be implemented by way of multiple resistive-switching memory cells collectively defined as an identifier bit (or by single cells defining a bit in some embodiments). Thus, depicted in FIG. 1 are PUF memory bits 112, RNG memory bits 118, OTP memory cells 114 as well as MTP or reversibly programmable memory cells 116. Array(s) 110 of resistive-switching memory cells can be characterized for other types of memory cell functions not specifically depicted in FIG. 1, where suitable.

Although array(s) 100 of resistive-switching memory cells illustrates designated sections of characterized memory cells, no spatial orientation, relative or absolute, is implied by the position of the dotted blocks within array(s) 110 of memory identifying PUF, OTP, MTP, or RNG data. Further, array(s) of resistive-switching memory cells can be uncharacterized (e.g., upon initial fabrication), re-characterized (e.g., in response to re-characterization of cells from RNG to MTP, from MTP to OTP, and so forth), or de-characterized (e.g., removing previous characterizations, where suitable), or the like, as suitable. Accordingly, the characterization of memory cells in array(s) 110 is illustrative only, and array(s) 100 can be wholly uncharacterized, have some of the disclosed characterizations, and so forth.

In at least one alternative or additional embodiment(s), some memory cells of array(s) 110 of two-terminal resistive-switching memory cells can have a fixed size or number of memory cells located within a group of addresses of array(s) 110 of memory pre-assigned to one operational characteristic (e.g., MTP operation, OTP operation, RNG operation, PUF operation, or the like). Some or all of these pre-assigned memory cells could be re-characterized by controller 120 in some aspects of the disclosure, although some pre-assigned memory cell characterizations can be permanent and not re-characterizable in at least one aspect, and depending on design choice. In such embodiments, a host command received by a controller 120 identifying addresses of target memory cells can imply an operation consistent with the pre-assigned operational characteristic associated with those addresses. As an example, a write command targeting memory cell addresses pre-assigned to PUF operational characterization can imply a PUF write command, and so forth. When implementing the write command on memory cells pre-assigned to PUF operation, controller 120 can implement instructions suitable for a PUF write, rather than an MTP write, OTP write, or even a RNG write, as an example. In other embodiments, even where some memory cells of array(s) 110 are pre-assigned a characterization, other memory cells can be un-characterized, and can instead be assigned an operational characterization selected by an end user (or an external host device), where suitable, or can even be dynamically characterized or re-characterized as described herein.

In a general sense, identifier memory functions as utilized herein can refer to memory utilized to generate, store or operate in a fashion to generate uncorrelated data, generally understood to be suitable for distinguishing one set of identifier data from another set of identifier data. As noted supra, specific examples of identifier memory can include resistive switching cells characterized to operate as PUF memory, RNG memory, or the like. Other resistive-switching memory cells of array(s) 110 can be characterized as OTP memory or MTP memory, as illustrated.

In some disclosed embodiments, one or more of: PUF bits 112, OTP bits 114, MTP bits 116 and RNG bits 118 can be separate memory structures from array(s) 110 of memory (e.g., located externally to array(s) 110 on a semiconductor chip) or can be at least in part included within array(s) 110 of memory (e.g., an array among a set of arrays that embody array(s) 110 of memory, a block of memory within such an array(s) 110, a set of pages within one or more blocks or arrays, or other suitable arrangement).

Figure 12:
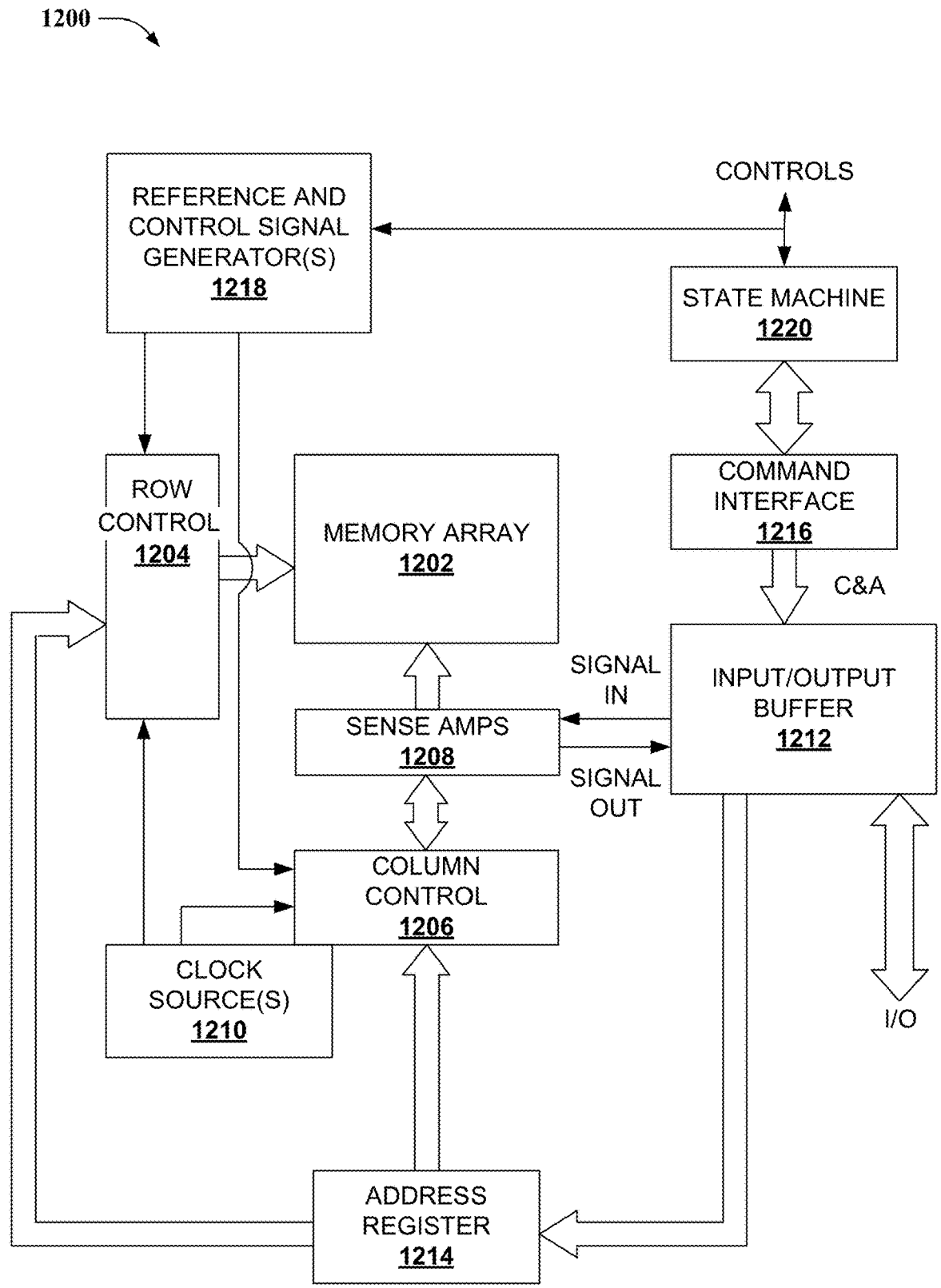
FIG. 12 illustrates a block diagram of a sample electronic operating environment in accordance with certain embodiments presented herein.

Controller 120 is provided to implement memory operations upon array(s) 110 of resistive-switching memory cells (e.g., see also FIG. 12, infra). Memory operations can include processes such as program (write), read, overwrite, erase, and so forth, operations suitable for operation of MTP bits 116. Memory operations can also include processes for program (write) or reading OTP bits 114. Instructions for implementing memory operations according to the various characterizations can be stored in trim instructions 122. Additionally, controller 120 can be configured to characterize different memory cells of array(s) 110 according to a disclosed function: an OTP characterization, an MTP characterization, a RNG characterization, a PUF characterization, or the like, or a suitable combination of the foregoing. Characterization of memory cells can be implemented in response to explicit memory characterization protocols (by way of command/data interface 130, for example), which can be implemented by a manufacturer post-fabrication of integrated circuit device 100, by a distributor or reseller of integrated circuit device 100 after fabrication, by an end-user as part of a chip calibration routine, or as a dynamic process during operation of integrated circuit device 100, or even in response to a host-generated memory command or memory cell characterization command, according to various embodiments. As an illustrative example, a host device communicatively coupled to integrated circuit device 100 can issue a host command to generate PUF data; such a host command can include or imply a PUF characterization protocol on memory bits identified in the host command, or a command to characterize cells as PUF bits 112 can be received separate from a command to generate PUF data from those cells. In various embodiments, trim instructions 122 can store protocols to characterize memory cells according to PUF, RNG, MTP, OTP characterizations, as well as implement memory operations consistent with those characterizations.

Also illustrated in integrated circuit device 100 is an input(s) 140 and output(s) 150. In some embodiments, input(s) 140 can include (or provide a pathway for) data to be stored within array(s) 110 of two-terminal resistive-switching memory cells, such as MTP bits 116 or OTP bits 114. Output(s) 150 can output data stored within resistive switching devices of array(s) 110, including PUF bits 112 and RNG bits 118 as well as OTP bits 114 and MTP bits 116. In some embodiments, output(s) 150 can output data that results from computations utilizing data stored in PUF bits 112 (or RNG bits 118), or stored within MTP bits 116 or OTP bits 114 resulting from such computations, in further embodiments.

A command/data interface 130 is provided to receive memory commands from an external device, and respond to those commands. Further, data to be written to array(s) 110 can be received by way of command/data interface 130, and data output from array(s) 110 can be provided over command/data interface 130. In at least some embodiments, controller 120 can dynamically expose selection and (re-) characterization of memory cells of array(s) 110 to an external host device (separate from integrated circuit device 100—not depicted) by way of command/data interface 130. In various example implementations, the external host device can be manufactured separately and communicatively interconnected by one or more network or device interfaces to command/data interface 130 to accomplish this embodiment(s).

In addition to the foregoing, disclosed resistive switching devices have excellent properties for generating identifier data sequences. Such properties include high entropy, which is suitable for generating random or substantially random numbers, low bit error rate (BER), inherent difficulty in reverse engineering or illicit side-channel data access, and fast sensing times. For example, a bit sequence of 128 or 256 identifier (e.g., PUF) bits can be formed from 128 or 256 resistive switching devices or 128/256 groups (e.g., pairs, etc.) of multiple such resistive switching devices (as described in differential identifier bit generation; see FIGS. 2, 3 and 5, infra). High randomness in generating identifier bits minimizes non-random patterns between bits (resistive switching devices/groups of such devices) of a sequence, mitigating or avoiding false rejection rates.

More specifically, bit error rates (BER)s of identifier data generated with disclosed resistive switching devices are extremely low compared to techniques for generating PUF with static random access memory (SRAM). This allows integrated circuit device 100 to generate highly non-correlated identifier bits without special BER-reducing circuitry permanently affixed to memory cells from which identifier data is generated. As a result, any native two-terminal resistive switching memory cell(s) can be utilized to generate PUF bits 112, and any suitable (low cycle count) two-terminal resistive switching memory cell(s) can be utilized to generate RNG bits 118. As a result, embodiments disclosed herein can utilize row and column selection circuitry (including multiplexers—not depicted, but see row control 1204 and column control 1206 of FIG. 12, infra) and processes associated with implementing read, write, erase and other memory operations on resistive switching devices (e.g., FIGS. 12 and 13, infra), and extend those circuitry and processes to generating or storing PUF data, RNG data, OTP data, MTP data, and so forth. In such embodiments, resistive switching devices utilized for MTP memory operations, identifier data or OTP storage need not be fixed on manufacture, and can be characterized or dynamically re-characterized by controller 120 in disclosed embodiments. Some technologies for generating PUF data cannot achieve these characteristics described for integrated circuit device 100.

In one or more embodiments, controller 120 can be operable to perform memory operations on array(s) 110 of memory. For instance, controller 120 can be operable to perform sensing operations pertaining to generating an identifier data bit from one (or a group of) resistive switching device(s) operably characterized as PUF bits 112 (or RNG bits 118), in an embodiment(s). Examples of non-differential sensing operations pertaining to generating an identifier bit from a single memory cell can include: native current of a never-programmed resistive switching device in the context of PUF data (or leak current of an un-programmed device in the context of RNG data) in response to a sub-program voltage, native electrical resistance of a resistive switching device, detection of program events, detection of speed or timing of program events, a program voltage, a program current, an on-state (programmed) resistance, an erase voltage or current, a delay frequency, a parasitic resistance or capacitance, a program or erase minimum pulse width, and so forth, or suitable combinations of the foregoing, as described herein (or as described within U.S. application Ser. No. 17/223,817 incorporated by reference hereinabove). In general, however, these sensing operations can be digitized to generate PUF or RNG data by comparing a measured result of a sensing operation (native current in response to sub-program voltage, detection of program event in response to a program signal, speed or timing of program event, a voltage at which a device becomes programmed, and so forth) to a threshold value stored in trim instructions 122 of controller 120. Generation of PUF data usually involves never-programmed resistive switching memory cells, whereas generation of RNG data can involve never-programmed cells, or un-programmed cells with relatively low program counts (e.g., fewer than 10 program events; fewer than 50 program events; fewer than 100 program events; fewer than 1000 program events; or other suitable value, or any suitable value or range there between), although the subject disclosure is not strictly limited to these definitions.

As further examples, controller 120 can be operable to perform a program operation(s) pertaining to generating an identifier data bit utilizing an identifier memory cell(s) 112, 118 of array(s) 110 of memory. Examples of such program operations include: applying a program voltage magnitude to a never-programmed (or un-programmed for RNG data) memory cell and determining whether the cell is programmed or not programmed in response to the selected program voltage magnitude (program voltage magnitude differentiation). The identifier data bit can be digitized by assigning a '1' if the cell is programmed, and '0' if not programmed (or vice versa). Further examples include: applying a program signal of selected pulse duration to a never-programmed (or un-programmed) memory cell and determining whether the cell is programmed or not programmed after the selected pulse duration (program time differentiation). Similar to the previous example, the identifier data bit can be digitized by assigning a '1' if the cell is programmed, and '0' if not programmed (or vice versa). Another example includes: applying a sub-program voltage to a never-programmed (or un-programmed) memory cell and determining whether a native (or leak) non-programmed current is above or below a preselected current threshold (native/leak current differentiation). The identifier bit can be digitized by assigning a '1' if native current is above the threshold and assigning a '0' if native current is below the threshold (or vice versa). Other examples or combinations of the foregoing known in the art or reasonably suggested to one of ordinary skill in the art by way of the context provided herein are considered within the scope of the present disclosure.

In still other embodiments, controller 120 can be configured to implement differential operations pertaining to generating an identifier bit from a plurality of resistive switching devices. Generally, differential operations compare response of one or more cells of a plurality of memory cells to a memory operation and digitize an identifier bit associated with the plurality of memory cells based on relative responses of the one or more memory cells. Differential operations usable to generate an identifier bit according to aspects of the present disclosure can include: differential program speed of a group of never (or un) programmed memory cells, differential native program voltage of the group of memory cells, differential native (leak) current of the group of memory cells, differential native electrical resistance of the group of memory cells, differential on-state resistance of the group of memory cells, differential erase voltage or current of the group of memory cells, differential delay frequency of the group of memory cells, differential parasitic resistance or capacitance of the group of memory cells, a differential program or erase minimum pulse width or duration of the group of memory cells, or the like, or a suitable combination of the foregoing. For differential operations, using the exemplary case of two cells per identifier bit (though the rule can be extended to three or more cells per identifier bit through proportional logic, optionally for generating multi-bit identifier data with suitable numbers of differential cells), the identifier bit can be digitized by assigning a '0' value to identifier bits in which a first memory cell has higher (or lower) native current/on-state resistance/erase voltage/delay frequency/parasitic resistance or capacitance/program or erase speed, etc., and assigning a '1' to identifier bits in which a second memory cell has the higher (or lower) native current/on-state resistance/erase voltage/delay frequency/parasitic resistance or capacitance/program or erase speed, and so forth. Rules for digitizing identifier bits utilizing differential operations on multiple memory cells can be stored in trim instructions 122, in an embodiment or elsewhere in controller 120 or integrated circuit device 100.

In yet other embodiments, controller 120 can be operable to selectively implement one-time programmable operations on selected PUF bits 112 to render permanent a PUF bit sequence generated with a program event at a set of PUF bits 112 (or, e.g., stored at a set of memory cells in response to generation at other memory cells by a non-program event, such as native leak current or the like). Described differently, a PUF data sequence comprising program and un-programmed bits can be reinforced with a strong program pulse, e.g., a one-time programmable pulse, to make program bits of the PUF data sequence non-erasable and create large sensing margin between the program bits and the un-programmed bits of the PUF data sequence. This can serve to greatly enhance longevity and accurate read cycle counts of the PUF bit sequence.

In still additional embodiments, controller 120 can be operable to establish one or more threshold metric levels (e.g., current level(s), resistance level(s), program voltage level(s), program speed level(s), etc.) for defining identifier bit values (e.g., logic levels; a '0' bit and a '1' bit in the binary context) from sensing operations or program operations performed on identifier memory cells 112, 118, as described herein. As an illustrative example, if an operational characteristic selected to generate identifier bit data is a native leak current, a current value threshold (or small range of values) (e.g., 500 nA, or any other suitable value or range) can be selected and resistive switching devices above the current value threshold can be allocated a '1' identifier bit value and devices below the current value threshold can be allocated a '0' identifier bit value. In other embodiments, a range of threshold values with a lower threshold and an upper threshold (e.g., a lower threshold of 400 nA and an upper threshold of 600 nA, or any other suitable threshold value or range of values) can be utilized. Devices with native current below 400 nA can be allocated a '0' identifier bit value; devices with native current above 600 nA can be allocated a '1' identifier bit value, and devices between 400 nA and 600 nA can be discarded, in an embodiment. In an embodiment, further read operations can use a 500 nA threshold to regenerate the '0' bit values and '1' bit values. Using lower and higher initial threshold values can increase sensing margin and reduce bit error rates, according to embodiments of the present disclosure.

It should be appreciated that a suitable threshold or set of thresholds can be established for other resistive switching device operational characteristics selected for generating identifier bit information. As another (non-limited) illustrative example, a logic level 0 can be associated with a program voltage of 2 volts or higher and a logic level 1 associated with a program voltage of 1.8 volts or below. As stated previously, other suitable thresholds can be used to define logic level values for identifier bits as disclosed herein. In some embodiments, when a large number of resistive switching devices are sensed as part of generating identifier bits, a threshold voltage, current, pulse width etc., can be selected such that approximately half of the devices become associated with a logic level 0 and another half become associated with a logic level 1. In some embodiments, threshold settings can be performed manually by way of controller 120; in other embodiments default threshold settings can be set (optionally stored in trim instructions 122) upon initializing a semiconductor chip.

In addition to the foregoing, controller 120 can be configured to define an arrangement or ordering of resistive switching devices (or groups of resistive switching devices) to create a multi-bit sequence of identifier bits. As one illustrative example, resistive switching devices 0:7 can be read and assigned to bits 0:7 of a bit sequence. In an alternative embodiment utilizing pairs of switching devices to a define an identifier bit—first resistive switching devices 0:7 in a block of array(s) 110 can be associated with second resistive switching devices (n:n+8) elsewhere in the block of the array(s) 110 (or in another block of the array(s) 110) by controller 120 to define identifier bits 0:7 of a (differential) bit sequence. The variable: n can be any suitable number greater than 7 if in the same block, or any number if in a different block or on a different wordline of the block. However, in particular embodiments the number n can be a multiple of the size of the bit sequence; e.g., for an 8-bit identifier sequence a multiple of n=8: 8, 16, 24, 32, . . . , 128, 256, 512, and so forth. In other embodiments, the bit sequence need not be derived from resistive switching devices arrayed in a particular order (consecutive or otherwise). As an example, from an ordinal line of resistive switching devices, devices 15, 90, 7, 21, 50, 2, 37, 19 (and suitable associated groups of other resistive switching devices in the differential programming context, where multiple resistive switching devices define each identifier bit) can be read and respectively assigned to bits 0:7 of an output bit string. The bit string can be of any selected length, defined by a matching number of resistive switching devices (or multiples of the matching number in the differential context). For instance, bit strings of 64 bits, 256 bits, 1024 bits, 64 kbits, or any other suitable subset of identifier memory cells 112, 118 up to all of identifier memory cells 112, 118 (which can include all of array(s) 110 of memory in at least some embodiments) may be employed for a bit string. As another non-limiting illustration, for a 256-bit PUF data sequence utilized for a cryptographic key, controller 120 can characterize a set of memory cells as PUF bits and define an ordering of resistive switching memory cells assigned to the PUF bits to correspond with a sequence of 256 bits. Bit values (e.g., logic levels, . . . ) generated from the assigned resistive switching memory cells can then be ordered by controller 120 consistent with the device(s) ordering to thereby create the 256-bit identifier sequence. As a specific illustration: where a row of 256 resistive switching devices in an array is selected for generating an identifier sequence, identifier bit values of the 256 resistive switching devices can be arranged in the order the resistive switching devices are physically situated in the row; however, this is an illustrative example only and any other suitable arrangement or ordering can be implemented by controller 120 as an alternative or in addition.

In should be understood that operations, configurations, characteristics and various illustrations and descriptions of controller 120 can be applicable to other controllers disclosed herein in various embodiments (e.g., with reference to FIG. 12, infra, memory array 1202 and components of operating environment 1200 configured for control of operations of memory array 1202). Conversely, operations, configurations, characteristics and various illustrations and descriptions of other controllers disclosed herein can be applicable to controller 120 in one or more embodiments.

Although presented briefly above, and now in more detail: rules for establishing a subset of switching devices of array(s) 110 according to a disclosed operational characterization can be stored in trim instructions 122. Trim instructions 122 can comprise rules for storing operational characterizations of the available characterizations of resistive-switching memory cells of array(s) 110, rules for identifying (and storing) memory cell addresses having one of the specified characterizations, rules for performing operations upon characterized switching devices consistent with the characterization, and so forth. For instance, trim instructions 122 can store rules for characterizing one or more groups of resistive switching devices of array(s) 110 as PUF bits 112, rules for coupling multiple resistive switching devices to form differential PUF bits in some embodiments (e.g., see FIGS. 2, 3 and 5, infra), rules for performing a PUF operation on a group of resistive switching devices characterized as PUF bits 112, such as a PUF write (to generate PUF bits) or a PUF read (to read data generated with a PUF write and stored at cells generating the data, stored at a portion of the cells generating the data, or stored at other cells within array(s) of memory 110, according to various embodiments), and rules for re-characterizing resistive switching devices as OTP bits 114, MTP bits 116 or RNG bits 118 previously characterized as PUF bits 112, or as no characterization. Trim instructions 122 can likewise store rules for characterizing one or more groups of resistive switching devices as OTP bits 114, MTP bits 116 or RNG bits 118, rules for coupling multiple resistive switching devices to form differential RNG bits (e.g., in a similar manner as provided herein for differential PUF bits, extended to un-programmed memory cells with low write counts), rules for performing an OTP, MTP or RNG operation, and rules for re-characterizing OTP bits 114, MTP bits 116 or RNG bits 118 as other characterizations (where suitable), or no characterization (e.g., utilizing default or conventional trim instructions in at least one embodiment).

To implement operations on memory cells consistent with a previous characterization, controller 120 can reference saved characterizations for groups of memory cells (e.g., stored in trim instructions 122 or elsewhere on integrated circuit device 100, such as within array(s) 110 itself) and obtain from trim instructions 122 suitable signal characteristics for a memory operation consistent with the characterization. Suitable signal characteristics can include: a voltage magnitude(s), current compliance, signal duration, dynamic voltage pulse as a function of time, and so forth. For a PUF write, for instance, trim instructions 122 can store suitable signal characteristics for various PUF write modalities described herein (e.g., utilizing native current, native electrical resistance, detected program event(s), among others). Trim instructions 122 can also store suitable inhibition signals for memory cells neighboring a cell(s) being operated upon, a termination condition(s) for terminating an operation signal, among other signal operations employed for implementing memory operations or identifier operations on resistive switching devices as known in the art or described herein. Likewise, trim instructions 122 can store suitable signal characteristics, inhibit signal characteristics, termination conditions, and so forth, for other disclosed identifier bit sensing operations. Further, trim instructions 122 can store rules for aggregating multiple memory cells to form a differential identifier bit, for differential PUF or RNG memory operation, and for aggregating groups of multiple memory cells to create multiple differential identifier bits to generate a sequence of PUF data or RNG data. Other operational rules, configurations, settings and the like can be stored in trim instructions 122 as disclosed herein, as known in the art or as reasonably conveyed to one of ordinary skill in the art by way of the context presented herein. For instance, trim instructions 122 can specify a subset of multiple memory cells defining a PUF bit (e.g., one memory cell of a pair of memory cells defining the PUF bit; two memory cells of four memory cells defining the PUF bit, etc.) as storing a data value for the PUF bit generated in response to a differential program protocol.

Figure 2:
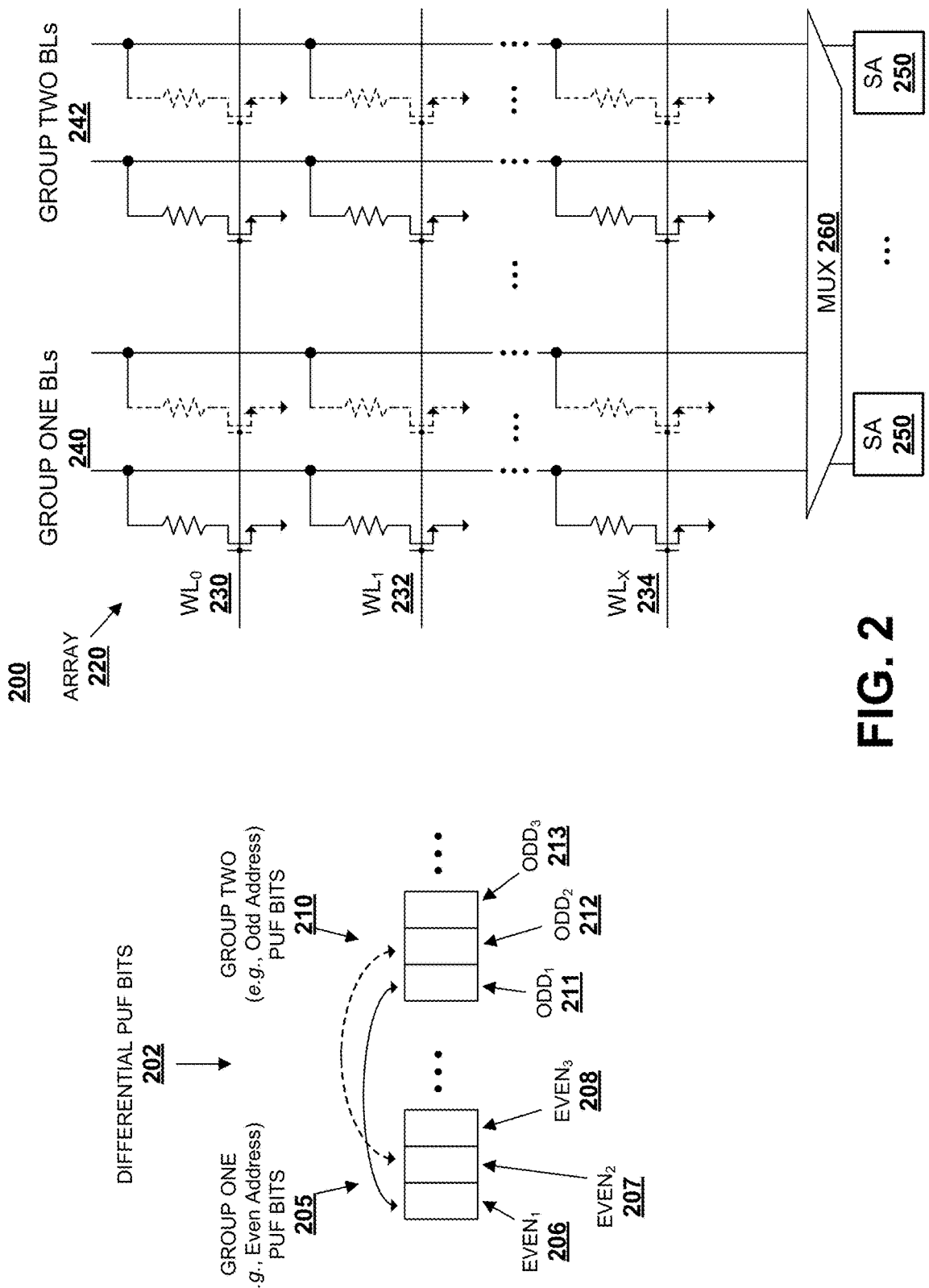
FIG. 2 depicts a diagram of a sample arrangement of multiple memory cells defining a differential bit, in an embodiment.

FIG. 2 illustrates a diagram of an example arrangement 200 of differential identifier bits according to alternative or additional embodiments of the present disclosure. Differential identifier bits can be utilized for generating PUF data or for generating RNG data, in various embodiments. On the left-side of FIG. 2 is an illustration of example groups of two-terminal resistive-switching memory cells (in this case, pairs) defining differential PUF bits 202 (also applicable to RNG bits). In the example differential PUF bits 202 illustrated by FIG. 2, a first group of memory cells on even bitlines of an array (e.g., array(s) 110, but see also array 220) are coupled with a second group of memory cells on odd bitlines of the array. Respective pairs of the memory cells from an even bitline and an odd bitline define a differential PUF bit 202, as described herein. It should be understood that the example of FIG. 2 is illustrative only, and not intended to limit the manner or arrangement in which a first memory cell from a first group of an array(s) (e.g., array(s) 110) can be combined with one or more additional memory cells from additional groups of the array(s) to define a differential PUF bit. For instance, the coupling of even and odd bitlines, though a serviceable example, is not intended to limit the creativity of one of ordinary skill in the art to define a differential PUF bit from two or more memory cells, whether on even bitline(s), odd bitline(s), a common wordline or different wordlines, or any other suitable location within an array(s). Rather, all disclosed examples as well as examples not explicitly disclosed but reasonably conveyed to one of ordinary skill by way of the context provided in the present disclosure are within the intended scope of a differential PUF bit 202.

In the example illustrated by FIG. 2, even address portions 205 of differential PUF bits 202 and odd address portions 210 of differential PUF bits 202 are shown. Although illustrated as blocks, the blocks of even and odd address portions 205, 210 represent (one or more) respective resistive switching cells of an array of resistive switching devices 220. The respective resistive switching cells can be the same or similar to cells 322, 324 of FIG. 3 or cells 522, 524 of FIG. 5 in some embodiments, whereas in other embodiments a resistive switching cell can have other arrangements of a resistive switching device and one or more transistors, as well as one or more other analog or digital circuit components suitable for a resistive switching cell known in the art or reasonably conveyed to one of ordinary skill in the art by way of the context presented herein, all of which are considered within the scope of the present disclosure.

Differential PUF bits 202 illustrate three PUF bits and respective even and odd memory cells forming the PUF bits. Even $cell_1$ 206 and odd $cell_1$ 211 form a first PUF bit, even $cell_2$ 207 and odd $cell_2$ 212 form a second PUF bit, and even $cell_3$ 208 and odd $cell_3$ 213 form a third PUF bit. Array 220 illustrates an arrangement of wordlines and bitlines defining an array of multiple resistive switching cells according to some disclosed embodiments. Two differential PUF bits 202, as described above, can be defined from the memory cells illustrated on each wordline of array 220, but it should be understood that many more pairs of differential PUF bits 202 can be defined in an array that is not limited by drawing area constraints, as one of skill in the art would readily understand.

The wordlines include $wordline_0$ 230, $wordline_1$ 232 through $wordline_x$ 234, where x is a suitable integer larger than 1, referred collectively as wordlines 230-234. Likewise, the bitlines include even bitlines 240 and odd bitlines 242. For an embodiment in which two memory cells define a differential PUF bit 202, a first PUF bit 202 can be defined (e.g., on a single wordline) and include a memory cell (e.g., $even_1$ 206) connected to one bitline of even bitlines 240 and a second memory cell (e.g., $odd_1$ 211) connected to one bitline of odd bitlines 242. A second PUF bit 202, can be defined by even and odd memory cells (e.g., $even_2$ 207 and $odd_2$ 212) on the same wordline (e.g., $wordline_n$ 230) adjacent to the memory cell and second memory cell, in an embodiment(s). In alternative embodiments, the second PUF bit 202 can be defined by memory cells that are on non-adjacent bitlines with respect to the memory cell and second memory cell, while still on the same wordline. In still other embodiments, the second PUF bit 202 can be defined by even and odd memory cells on a different wordline (e.g., $wordline_1$ 232). Moreover, any plurality of the PUF bit, second PUF bit, a third PUF bit (e.g., defined by $even_3$ 208 and $odd_3$ 213), or other PUF bits not depicted can form a PUF data sequence (or portion thereof) when on the same wordline in either adjacent or non-adjacent bitlines, or on different wordlines in adjacent or non-adjacent bitlines, or suitable combinations of the foregoing. In still other embodiments, a differential PUF bit can be defined from more than two memory cells of array 220. Where PUF bits of a data sequence reside on different wordlines, suitable inhibition circuitry or signal processes can be provided for array 220 to mitigate or avoid bit disturb effects on memory cells not associated with the data sequence, or PUF bits on a subset of bitlines or wordlines can be operated upon sequentially while inhibiting other portions of the bitlines and wordlines connected to one or more PUF bits, or a suitable combination of the foregoing.

Electrical response of a memory cell can be measured on a bitline connected to the memory cell. As depicted, one or more sense amps 250 can be selectively connected to or disconnected from even bitlines 240 and odd bitlines 242. In various embodiments, a multiplexer 260 or other switching device or circuit (e.g., transistor, or other switch) can electrically connect a sense amp 250 to even bitlines 240, and can connect a second sense amp 250 to odd bitlines 242. Sense amps 250 can be utilized to determine whether voltage or current on a connected bitline changes (e.g., voltage reduces, current increases, and so forth) in a manner indicating a program event has occurred for a memory cell coupled to that connected bitline. In one embodiment, sense amps 250 and multiplexer 260 can be instituted on a ground path for an array 220 (e.g., through transistors connected to wordline 320 in FIG. 3, infra) or sense amps 250 and multiplexer 260 can be instituted on a supply voltage path for the array 220 (e.g., through Viclamp transistors coupling bitlines 312A, B to program supply 310 of FIG. 3, or coupling bitlines 512A, B to program supply 510 of FIG. 5, infra). In at least one embodiment, multiplexer 260 can be a M×N multiplexer (where M and N are respective positive integers), where N can be a number of sense amps 250 and a number of groups of memory cells defining identifier bits for a bit sequence, and where M can be a number of bitlines coupled to the memory cells of the groups.

Figure 3:
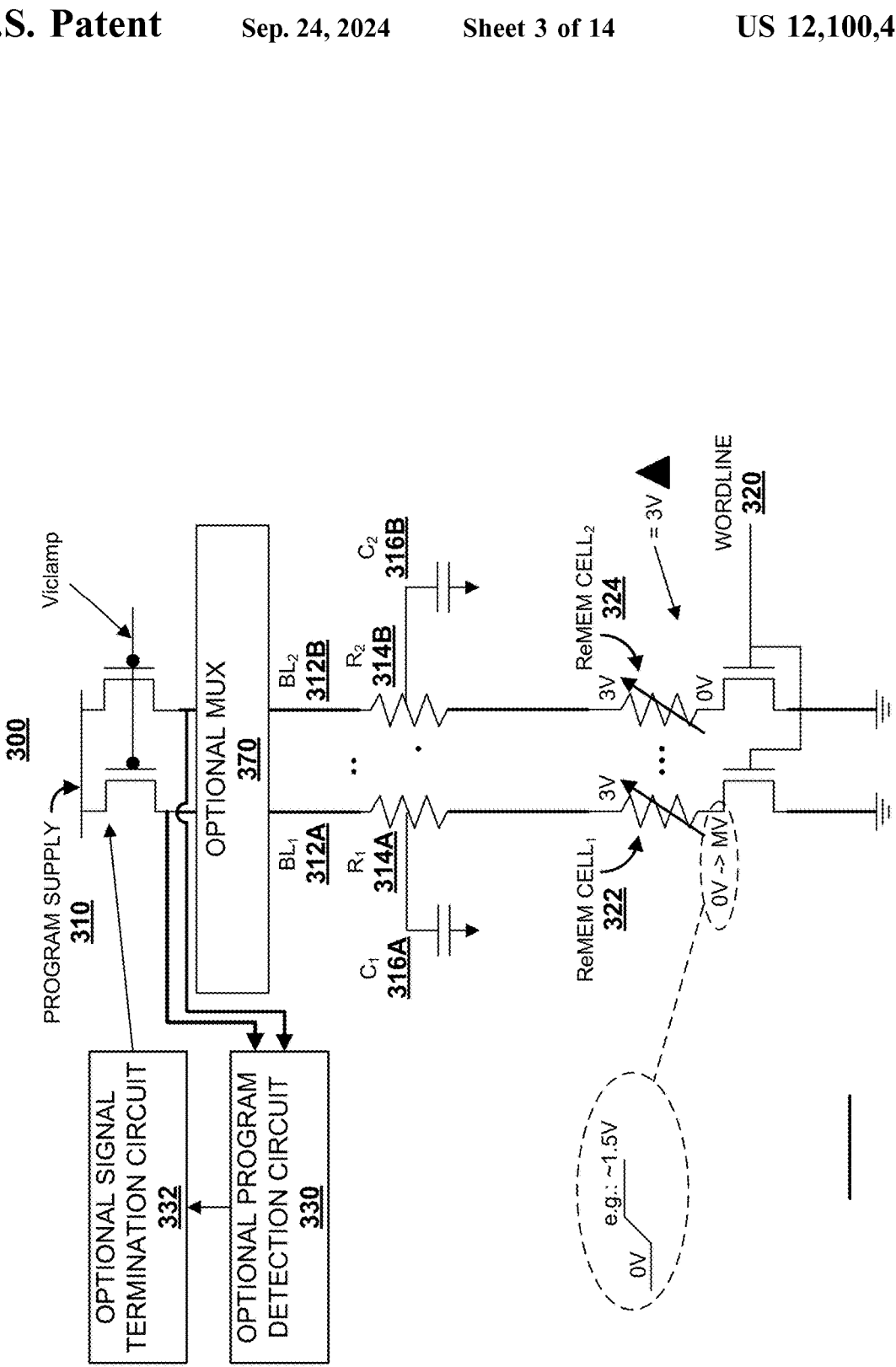
FIG. 3 illustrates a schematic diagram of an example of a differential program circuit for programming a differential bit according to further embodiments.

FIG. 3 illustrates a schematic diagram of an example differential cell sensing and program circuit 300, according to various embodiments of the present disclosure. Optionally, circuit 300 can include a program detection and signal termination circuits, as described in more detail below. Circuit 300 illustrates two bitlines of an array, specifically: bitline $BL_1$ 312A and bitline $BL_2$ 312B (referred to hereinafter collectively as bitlines 312A-312B). These bitlines 312A, 312B have inherent electrical resistance and capacitance characteristics in the array, represented by $R_1$ 314A and $C_1$ 316 for $BL_1$ 312A, and represented by $R_2$ 314B and $C_2$ 316B for $BL_2$ 312B, respectively.

The bitlines 312A, 312B are also connected to respective first terminals of a pair of two-terminal resistive switching memory cells: ReMEM $cell_1$ 322 and ReMEM $cell_2$ 324 (referred to hereinafter collectively as memory cells 322-324) that define one PUF bit (e.g., a differential PUF bit 202). Similar to the schematic representation from array 220 of FIG. 2, supra, respective second terminals of ReMEM $cell_1$ 322 and ReMEM $cell_2$ 324 are connected to respective transistor devices activated or deactivated by a wordline 320. When wordline 320 activates the transistor devices, the second terminals of memory cells 322-324 are connected (by respective paths) to ground, or a low voltage. When wordline 320 deactivates the transistor devices, the second terminals of memory cells 322-324 are isolated from ground/low voltage.

As illustrated, bitlines 312A, 312B can be clamped to a common program supply voltage 310. This can be implemented by respective transistors (illustrated as Viclamp) having gate nodes activated by a Viclamp line, or a multiplexer, or other suitable mechanism. When program supply voltage 310 cycles up, the Viclamp line activates the Viclamp transistors and wordline 320 activates the transistor devices coupled to ground, a suitable program voltage is provided across memory cells 322, 324. In the example illustrated by FIG. 2, three volts appears across memory cells 322, 324 supplying a programming potential. A binary value of the PUF bit defined by memory cells 322, 324 is established in response to one of memory cells 322, 324 becoming programmed, and a second of memory cells 322, 324 remaining unprogrammed. Thus, depending on convention (e.g., stored in trim instructions 122), the PUF bit can generate a '0' value if memory cell 322 programs and memory cell 324 remains unprogrammed and a '1' value if memory cell 322 remains unprogrammed and memory cell 324 programs (or vice versa, for an opposite convention). In the example depicted by FIG. 3, ReMEM cell$_1$ 322 programs causing the voltage across the cell to reduce to a moderate voltage MV, which can be about 1.5 volts or other suitable value (depending on program supply voltage 310 and relative resistance of the programmed ReMEM cell$_1$ 322 and R$_1$ 314A resistance).

Once a program cycle is complete, memory cells 322, 324 can be measured (e.g., by controller 120) to determine the PUF bit value generated by memory cells 322, 324, as described above. Based on the above convention, however, if ReMEM cell$_2$ also becomes programmed during the program cycle, the PUF bit can be invalid (e.g., see FIG. 7, infra). To reduce the likelihood of an invalid PUF bit in response to dual programming of memory cells 322, 324, an optional program detection circuit 330 can be provided and configured to detect programming either of ReMEM cell$_1$ 322 or ReMEM cell$_2$ 324, and an optional signal termination circuit 332 can be configured to terminate program supply voltage 310. Upon indication of the detected programming event from optional program detection circuit 330, optional signal termination circuit 332 can be configured to terminate supply voltage 310 from BL$_1$ 312A in some embodiments, from BL$_2$ 312B in other embodiments, or from both BL$_1$ 312A and BL$_2$ 312B in still further embodiments. Optional program detection circuit 330 can be a voltage detection circuit, a current detection circuit, an electrical power detection circuit, or the like, or a suitable combination of the foregoing. After detecting a voltage/current/power event at one of bitlines 312A, 312B indicative of a program event, this indication can be output to optional signal termination circuit 332. In response, optional signal termination circuit 332 can be configured to terminate program supply voltage 310 to a non-programmed memory cell or both memory cells, to decrease a likelihood that both cells become programmed, producing an invalid PUF bit.

Figure 4:
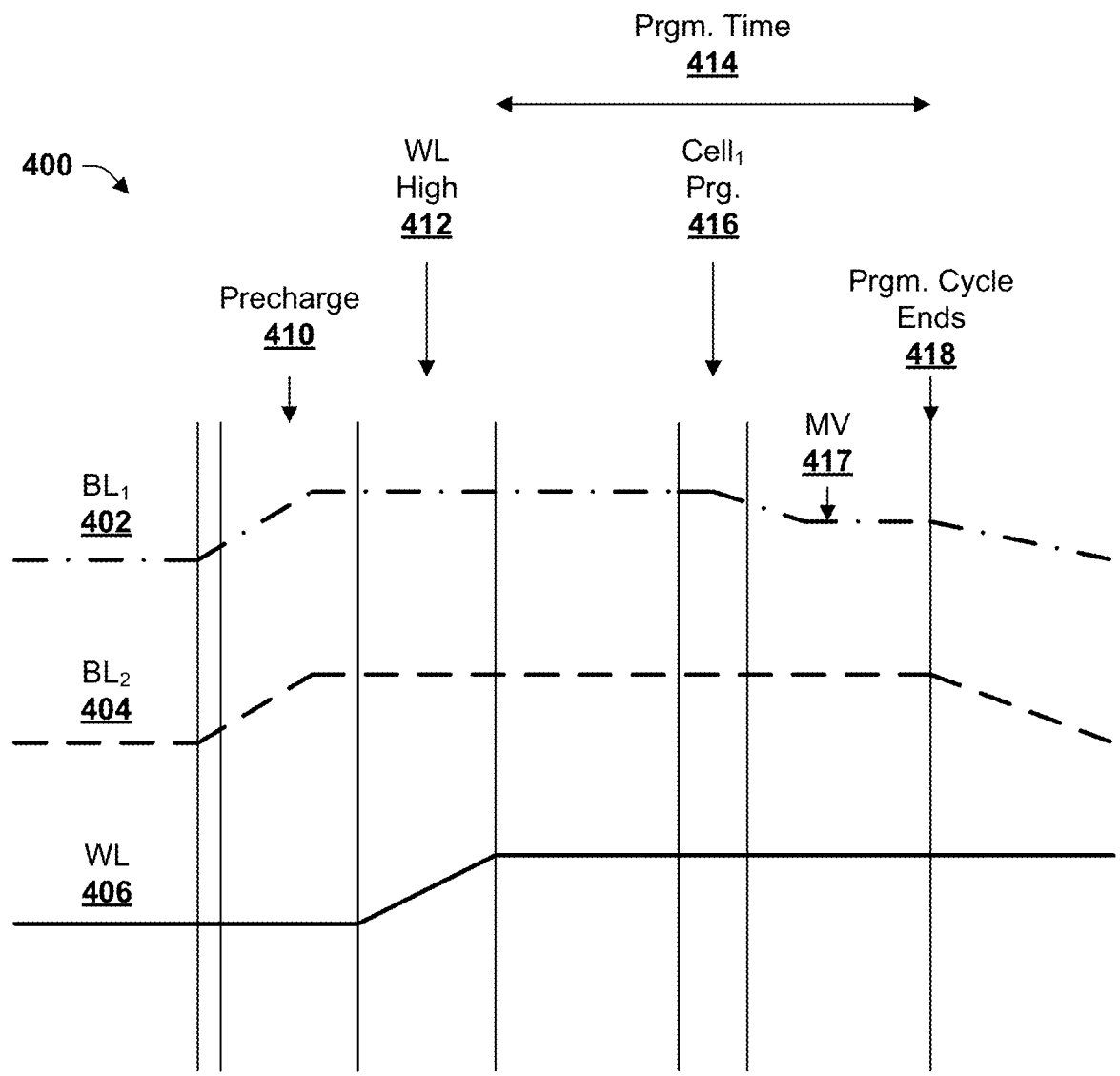
FIG. 4 depicts an example signal timing chart for the differential program circuit of FIG. 3, in an embodiment(s).

FIG. 4 depicts a voltage versus time graph of operation signals 400 representing the differential program of FIG. 3, supra. A voltage of bitline BL$_1$ 312A is provided by the dashed and dotted line indicated BL$_1$ 402, and a voltage for bitline BL$_2$ 312B is provided by the dashed line indicated BL$_2$ 404. Meanwhile the voltage on wordline 320 is provided at WL 406.

During a precharge phase 410, program supply voltage 310 increases from zero to full voltage (e.g., three volts, or other suitable program voltage). A wordline high phase 412 occurs to increase voltage on wordline 320 and activate the transistor devices connecting second terminals of memory cells 322, 324 to low voltage, or ground. Once WL 406 ramps up to activate the transistor devices, a program time 414 begins in which approximately the program supply voltage 310 (e.g., about 3 volts, or approximately the full voltage of the program supply voltage 310) appears across memory cells 322, 324. In the example illustrated by FIG. 3, ReMEM cell$_1$ 322 programs, as shown by cell$_1$ program phase 416, where voltage across ReMEM cell$_1$ 322 begins to decrease to a moderate voltage: MV 417. Meanwhile, voltage across BL$_2$ 404 remains unchanged until program cycle ends 418 and program supply voltage 310 begins to discharge. In an optional embodiment where optional program detection circuit 330 and optional signal termination circuit 332 are suitably configured, voltage across BL$_2$ 404 can begin to decrease prior to program cycle end 418.

Figure 5:
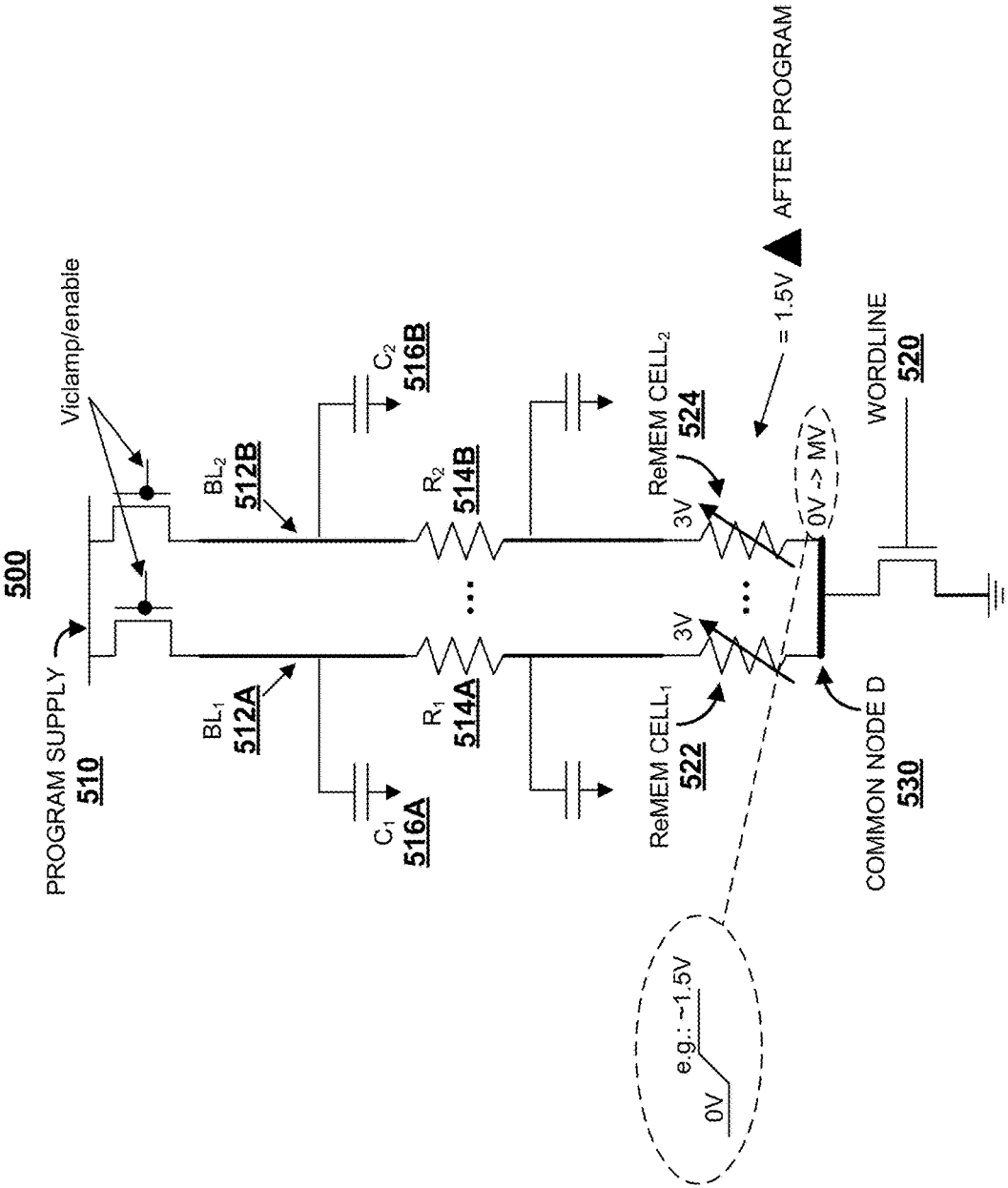
FIG. 5 depicts a schematic diagram of an illustrative differential programming circuit according to further embodiments of the present disclosure.

FIG. 5 depicts a differential cell sensing and intrinsic program termination circuit 500 according to further embodiments of the present disclosure. Circuit 500 is configured to mitigate or avoid generation of invalid PUF bits in response to a differential PUF write process (e.g., as described at FIG. 3, supra). By way of example, circuit 500 can be configured to rapidly and intrinsically suppress programming of one resistive-switching memory cell in response to the programming of a second resistive-switching memory cell. When the one resistive-switching memory cell and the second resistive-switching memory cell define a differential PUF bit (e.g., differential PUF bit 202 of FIG. 2, supra), suppressing the programming of the one differential cell in response to the programming of the second differential cell (or vice versa) mitigates or avoids the invalid PUF bit that occurs when both memory cells become programmed.

Circuit 500 includes a first bitline BL$_1$ 512A and a second bitline BL$_2$ 512B (referred to collectively hereinafter as: bitlines 512A, 512B). Bitlines 512A, 512B have an inherent resistance, respectively: resistance, 514A associated with BL$_1$ 512A and resistance R$_2$ 514B associated with BL$_2$ 512B. Additionally, bitlines 512A, 512B have inherent capacitance, respectively: capacitance C$_1$ 516A associated with BL$_1$ 512A and capacitance C$_2$ 516B associated with BL$_2$ 512B. The resistance and capacitance of bitlines 512A, 512B cause an RC time delay associated with charging a bitline to a voltage, or discharging the voltage from the bitline. This charge and discharge time is reflected in the ramp-up times during precharge and discharge phases of bitlines 512A, 512B illustrated in FIG. 6, infra.

Respective transistors (whether dedicated or part of a multiplexer, such as multiplexer 260 of FIG. 2, supra, or the like) can selectively couple or decouple bitlines 512A and 512B to/from a program supply voltage 510. Bitlines 512A, 512B are also respectively connected to first terminals of resistive-switching memory cells that define a differential PUF bit (or a differential RNG bit). Specifically, BL$_1$ 512A is connected to a first terminal of ReMEM cell$_1$ 522 and BL$_2$ 512B is connected to a second terminal of ReMEM cell$_2$ 524 (referred to hereinafter collectively as memory cells 522, 524). Second terminals of memory cells 522, 524 can be selectively electrically shorted at a common node: D 530. For instance, a second terminal of ReMEM cell$_1$ 522 can be selectively connected to (or disconnected from) common node D 530 (e.g., by way of a transistor, a multiplexer such as multiplexer 260, or the like), and a second terminal of ReMEM cell$_2$ 524 can be selectively connected to (or disconnected from) common node D 530 (e.g., by way of the transistor, a second transistor, or the multiplexer, or the like). A wordline can activate or deactivate a transistor coupled to common node D 530. The transistor (or switch, or multiplexer, etc.), when activated, couples common node D 530 to low voltage or ground. In an embodiment, the transistor/switch/multiplexer has sufficient resistance compared with bitline resistance R$_2$ 514B or bitline resistance R$_1$ 514A and the pull-up switches connecting program supply 510 to bitlines 512A, B to enable common node D 530 to pull-up from one to several hundred millivolts in response to programming of ReMEM cell$_1$ 522 or ReMEM cell$_2$ to a low resistance state, as an example.

Differential programming of memory cells 522, 524 can be accomplished by electrically coupling bitlines 512A, 512B to program supply 510, activating wordline 520 and connecting common node D 530 to low voltage, or ground, and increasing program supply voltage 530 to a suitable program magnitude (e.g., a range of about two (2) to about three (3) volts; a range of about one and a half (1.5) to about two and a half (2.5) volts; a range of about two (2) to about three and a half (3.5) volts, or the like, or any suitable value or range therein: ~1.5 volts, ~1.6 volts, ~1.7 volts, ~1.8 volts, ~1.9 volts, ~2.0 volts, ~2.1 volts . . . , ~3.3 volts, ~3.4 volts, ~3.5 volts, and so on). This results in approximately the program magnitude voltage appearing across memory cells 522, 524. This program magnitude voltage results in programming of one of memory cells 522, 524 to a low resistance state. This low resistance state causes common node D 530 to increase from low voltage (e.g., ground or about zero volts, or other suitable low magnitude relative to the program magnitude voltage) to a moderate voltage MV, such as 1.5 volts. As a result, the voltage magnitude appearing across the non-programmed memory cell, for example ReMEM $cell_2$ 524, decreases from the program magnitude voltage (e.g., ~3 volts) to the program magnitude voltage minus the moderate voltage MV (e.g., ~3V minus ~1.5 volts, or about 1.5 volts). Moreover, this decrease of voltage appearing across the non-programmed memory cell (e.g., ReMEM $cell_2$ 524) can occur very rapidly in response to programming of programmed memory cell (e.g., ReMEM $cell_1$ 522). In an embodiment, the decrease of voltage across the non-programmed memory cell can be less than about twenty nanoseconds (ns) after programming of the programmed memory cell, less than about ten nanoseconds after the programming of the programmed memory cell, from one to ten nanoseconds, from one to five nanoseconds, or the like.

The reduction of voltage across the non-programmed memory cell can avoid the RC time delay associated with bitlines 512A, 512B. As an example, the discharge of voltage on bitline 512A below a suitable threshold magnitude indicative of a programming event in ReMEM $cell_1$ 512A to a low resistance state, can take a few to several hundred nanoseconds depending on the resistance and capacitance values of $R_1$ 514A and $C_1$ 516A. Once detected, termination of program supply voltage 510 also is subject to the RC time delay, requiring perhaps another several hundred nanoseconds to about a microsecond to accomplish. Thus, the intrinsic program suppression of circuit 500 can much more quickly and efficiently reduce voltage across the unprogrammed cell to inhibit programming of the unprogrammed cell, and avoid the invalid differential PUF bit described above. Thus, circuit 500 achieves a significant benefit in mitigating or avoiding bit errors in generating differential PUF bits from groups of two-terminal resistive-switching memory cells (e.g., see FIG. 7, infra).

Following a program cycle applied to bitlines 512A, B a read operation can be implemented to determine which memory cell 522, 524 programmed in response to the program cycle. Sensing can be done on a ground path where common node D 530 can be selectively activated and deactivated by a switch (e.g., as part of a multiplexer, or other suitable switching circuit) or can be provided on a supply path utilizing a multiplexer (e.g., comprising Viclamp/enable transistors) or other switching circuit that can be coupled to bitlines 512A, B, for instance.

Figure 6:
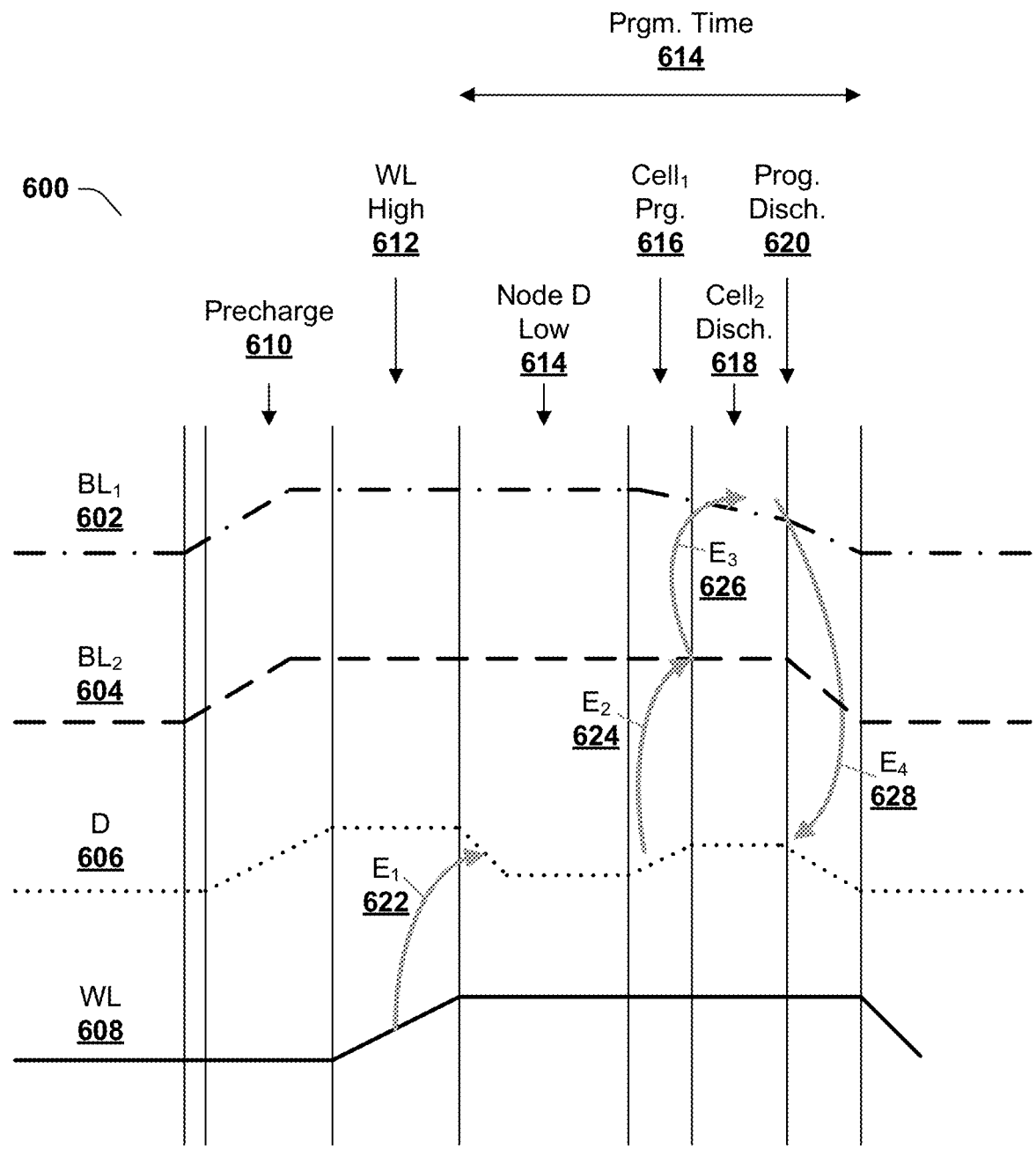
FIG. 6 illustrates a sample signal timing chart for the differential program circuit of FIG. 5, in additional embodiments.

FIG. 6 depicts a voltage versus time graph of operation signals 600 representing the differential program of FIG. 5, supra. A voltage of bitline $BL_1$ 512A is provided by the dashed and dotted line indicated $BL_1$ 602, and a voltage for bitline $BL_2$ 512B is provided by the dashed line indicated $BL_2$ 604. Meanwhile the voltage on wordline 520 is provided at WL 608 and the voltage appearing at common node D 530 is provided at D 606. Operation signals 600 begin with a precharge phase 610 in which program supply voltage 310 increases to a program voltage magnitude. Voltages on $BL_1$ 602, $BL_2$ 604 and node D 606 increase with program supply voltage 310 during precharge phase 610. A wordline high phase 612 increases voltage on wordline 520 to couple common node D 530 to low voltage, or ground, an $event_1$ 622 that results in a node D low phase 614. This initiates a program time 614 in which program magnitude voltage appears across memory cells 522, 524. When ReMEM $cell_1$ 522 programs at $cell_1$ program phase 616, node D voltage 606 immediately rises at $event_2$ 624 to a moderate voltage, resulting in discharge of voltage across $BL_2$ 604 at $event_3$ 626 and a $cell_2$ discharge phase 618. When program cycle concludes, a program discharge phase 620 begins and $event_4$ 628 of reduction in voltage across the common node D 530.

Figure 7:
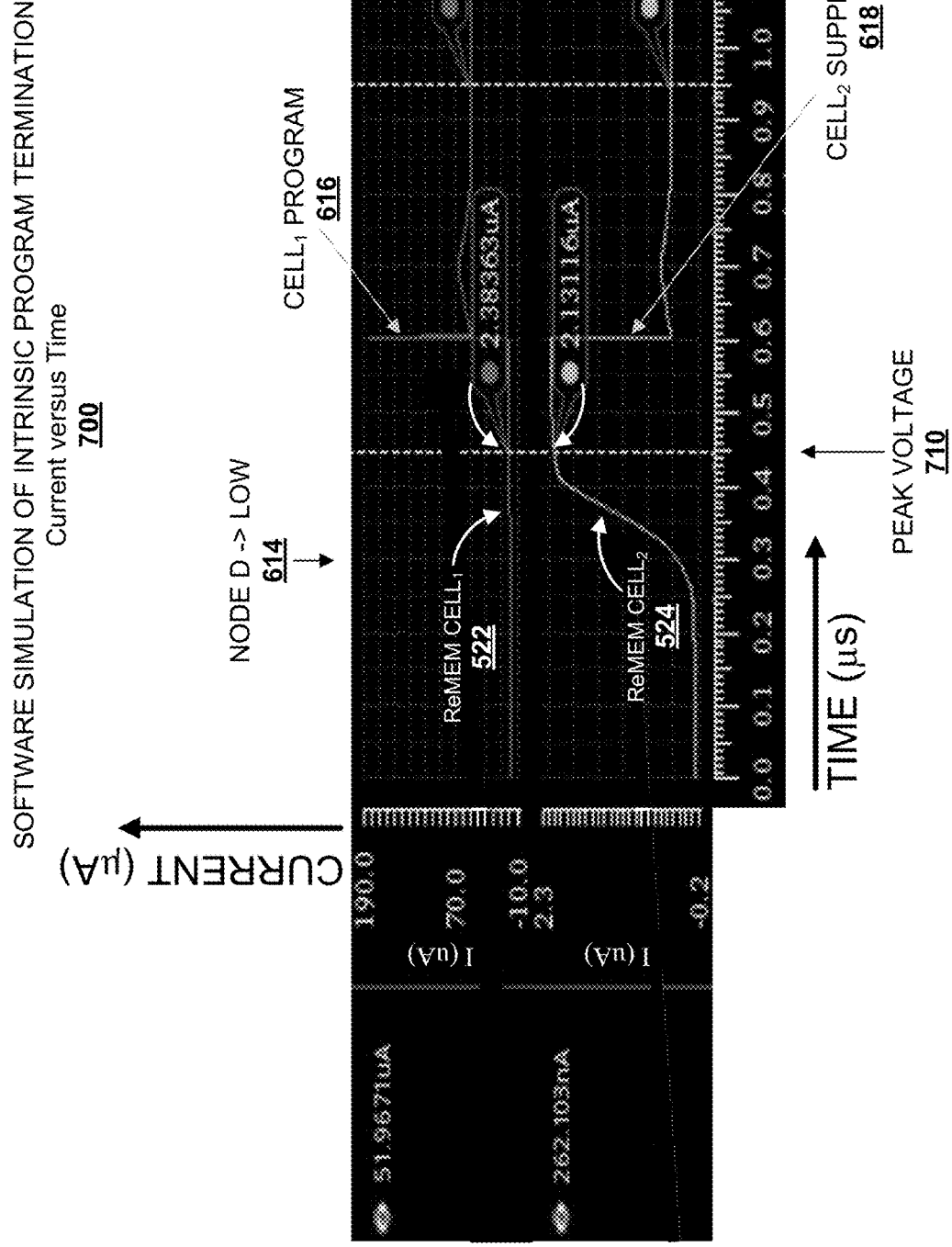
FIG. 7 depicts an example current response of a model of an intrinsic differential program inhibition circuit according to additional embodiments.

FIG. 7 illustrates a current versus time graph of a software simulation 700 of intrinsic program termination according to various disclosed embodiments. A vertical axis charts current in microamperes (µA) and a horizontal axis charts time in microseconds (µs). The top chart graphs current of ReMEM $cell_1$ 522 and the bottom chart graphs current of ReMEM $cell_2$ 524. Current for both memory cells begins to rise at about 0.3 us when node D goes low at 614. A peak voltage 710 is reached at about 0.45 µs, and current of about 2.38 µA and about 2.13 µA is reached for ReMEM $cell_1$ 522 and ReMEM $cell_2$ 524, respectively.

At about 0.6 µs ReMEM $cell_1$ 522 programs 616 with a spike in current of just under about 190 µA, and current through ReREM $cell_2$ 524 is almost immediately suppressed at 618. As voltages normalize on bitlines 512A, 512B (after about 0.9 µs) ReMEM $cell_1$ 522 has a current of about 52 µA—demonstrating a low-resistance program state—and ReMEM $cell_2$ 524 has a current of about 0.26 µA (or 262 nanoamps)—demonstrating a high-resistance unprogram state. The immediate suppression of current at ReMEM $cell_2$ 524 gives little to no opportunity for ReMEM $cell_2$ 524 to become programmed, once ReMEM $cell_1$ 522 is programmed. Software simulation 700 therefore demonstrates the effective mitigation of invalid bit generation for differential PUF bits resulting from programming of multiple cells defining the differential PUF bit.

Figure 8:
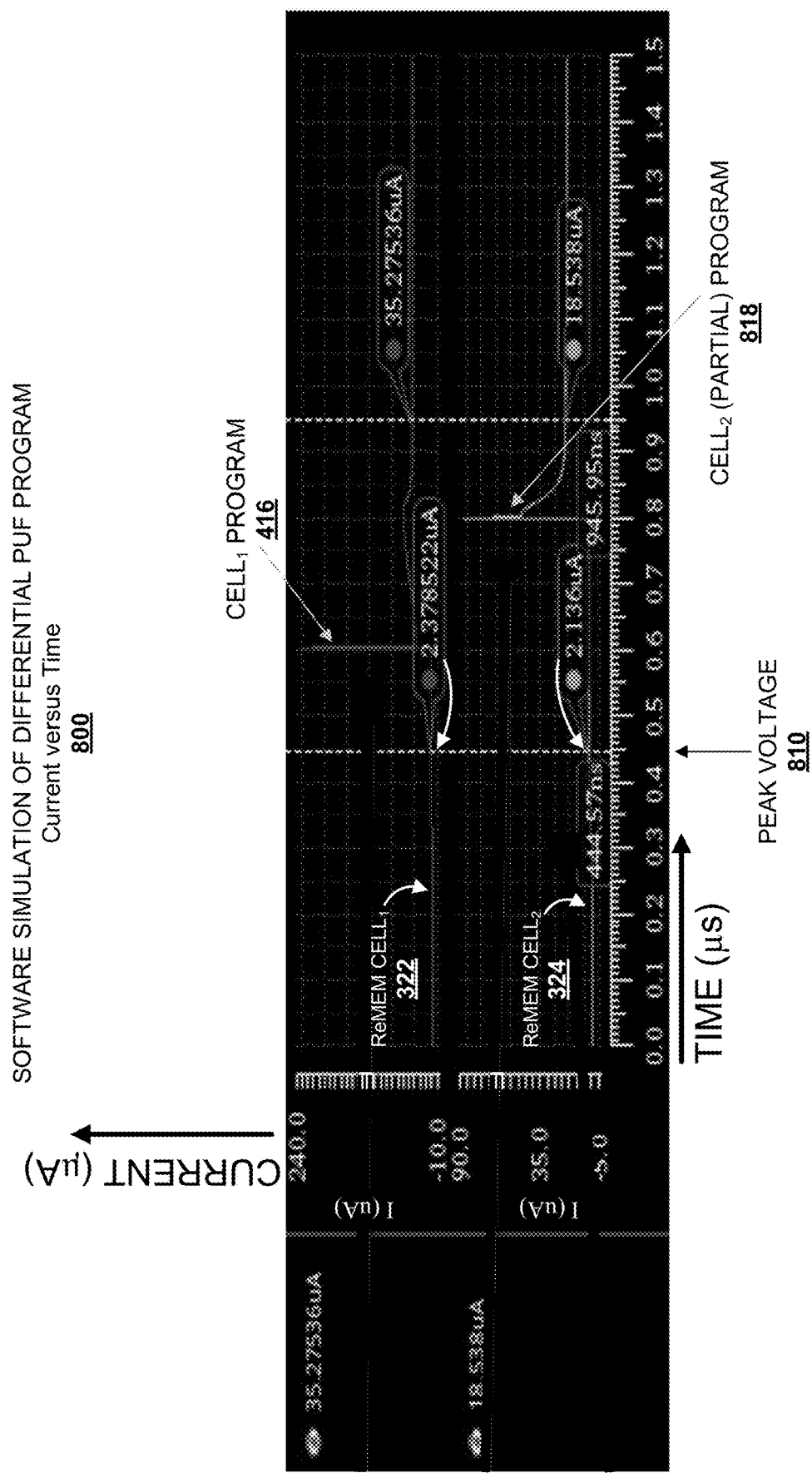
FIG. 8 depicts an illustrative current response of a model of a differential program circuit without intrinsic inhibition according to further embodiments.

FIG. 8 illustrates a current versus time graph of a software simulation 800 of intrinsic program termination according to various disclosed embodiments. A vertical axis charts current in µA and a horizontal axis charts time in µs. The top chart graphs current of ReMEM $cell_1$ 322 and the bottom chart graphs current of ReMEM $cell_2$ 324. Current for both memory cells at a peak voltage 710 at about 0.45 us is provided. Specifically, current of about 2.38 µA and about 2.13 µA is reached for ReMEM $cell_1$ 322 and ReMEM $cell_2$ 324, respectively. At about 0.6 µs ReMEM $cell_1$ 322 observes a $cell_1$ program event 416 and current spikes to a bit under 240 µA. Additionally, at about 0.8 µs ReMEM $cell_2$ 324 experiences current just below 90 µA in a $cell_2$ program event 818 (or at least a partial program event). After voltage normalization on bitlines 312A, 312B (after about 0.95 µs), ReMEM $cell_1$ 322 has a current of about 35 µA and ReMEM $cell_2$ 324 has a current of about 18.5 µA. Software simulation 800 illustrates a PUF program operation that inadvertently programs both memory cells of a differential PUF bit, resulting in an invalid PUF bit value.

The diagrams included herein are described with respect to several circuits, controllers, interfaces and arrays of resistive switching devices or an integrated circuit device(s) comprising multiple circuits, controllers, interfaces or arrays. It should be appreciated that such diagrams can include those circuits, controllers, etc., specified therein, some of the specified circuits/controllers/interfaces/arrays, or additional circuits/controllers/interfaces/arrays not explicitly depicted but known in the art or reasonably conveyed to those of skill in the art by way of the context provided herein. Components of disclosed integrated circuit devices can also be implemented as sub-components of another disclosed component (e.g., input 140 and output 150 can be sub-components of controller 120), whereas other components disclosed as sub-components can be separate components in various embodiments (e.g., PUF bits 112, OTP bits 114, MTP bits 116 and RNG bits 118 can be separate arrays as opposed to portions of array(s) 110). Further, embodiments within a particular Figure of the present specification can be applied in part or in whole to other embodiments depicted in other Figures without limitation, subject only to suitability to achieving a disclosed function or purpose as understood by one of skill in the art, and vice versa. As illustrative (and non-limiting) examples, optional program detection circuit 330 and optional signal termination circuit 332 of FIG. 3 can be coupled with circuit 500 of FIG. 5; array(s) 110 of resistive switching memory cells as depicted in FIG. 1 can be populated with differential PUF bits 202 or array 220; array(s) 110 can be operably coupled with controller 120 as depicted or with controller 120 and some or all array control components of FIG. 12 (e.g., row control 1204, sense amps 1208, column control 1206, clock source(s) 1210, address register 1214, reference and control signal(s) generator 1218, state machine 1220, input/output buffer 1212, command interface 1216), or substituted for memory array 1202 of FIG. 12, or volatile memory 1310A or non-volatile memory 1310B of FIG. 13, or suitable components of operating and control environment 1200 or environment 1300 can be substituted or added to other components or integrated circuit devices disclosed herein, and so forth. Additionally, it is noted that one or more disclosed processes can be combined into a single process providing aggregate functionality. For instance, a write process can comprise a read-verify process, or vice versa, to facilitate storing data at memory or generating data within memory and reading that stored/generated data, by way of a single process. Components of the disclosed architectures can also interact with one or more other components not specifically described herein but known by those of skill in the art.

Figure 9:
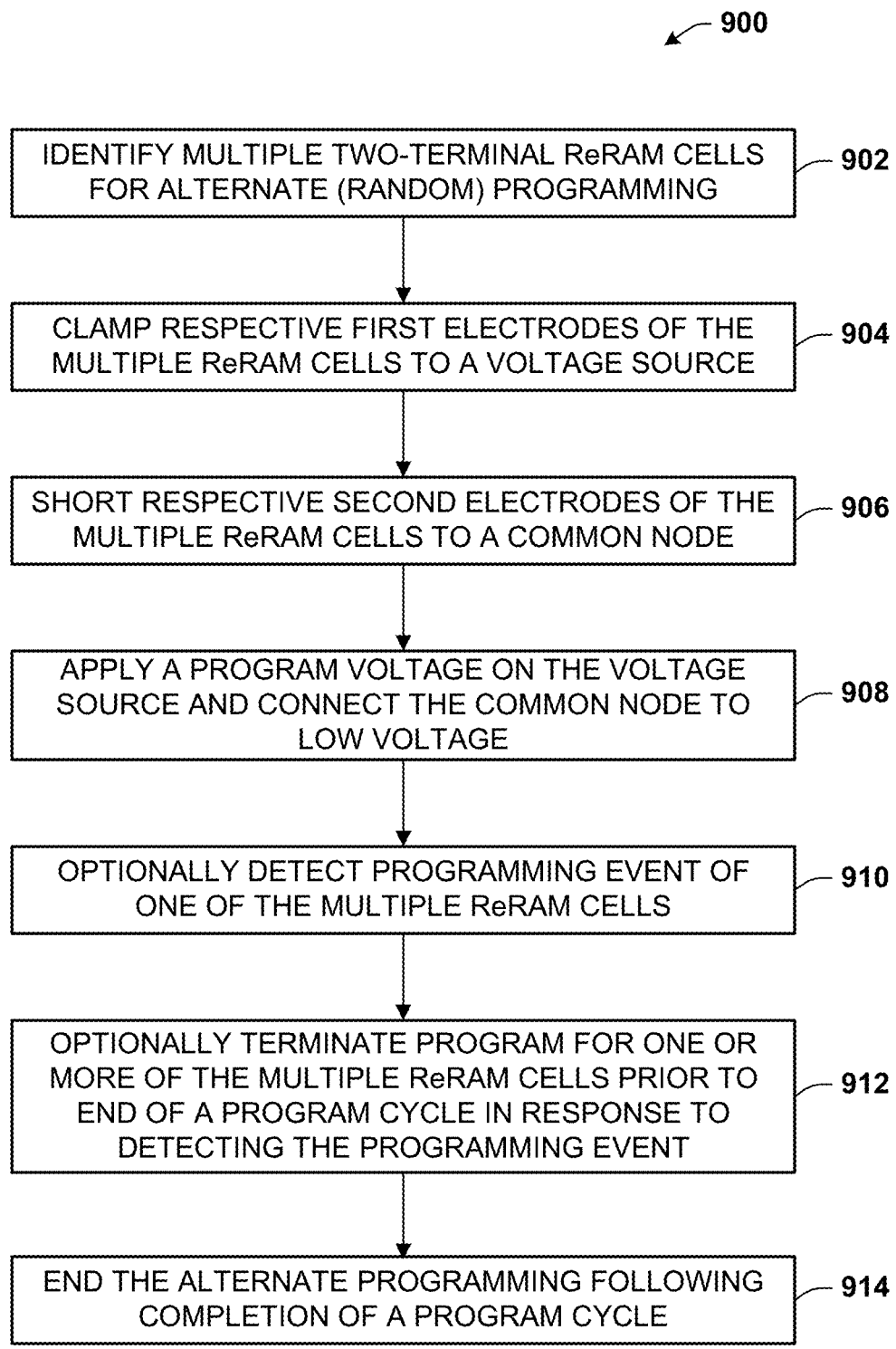
FIG. 9 illustrates an example method for implementing differential programming for two-terminal memory with intrinsic program inhibition, in an embodiment.
Figure 10:
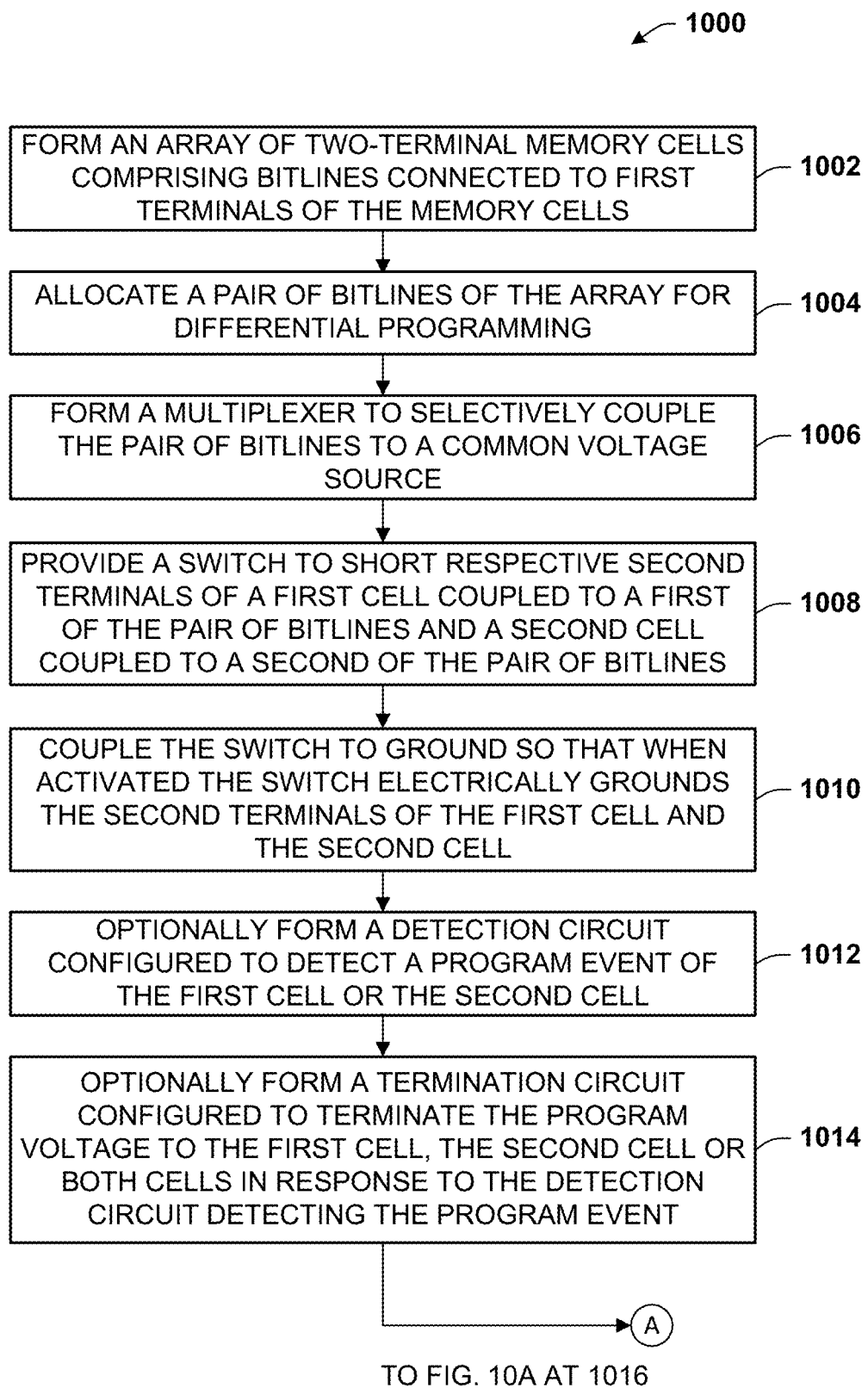
FIGS. 10 and 10A depict a sample method for fabricating a differential program circuit with intrinsic program inhibition according to still further embodiments of the disclosure.
Figure 11:
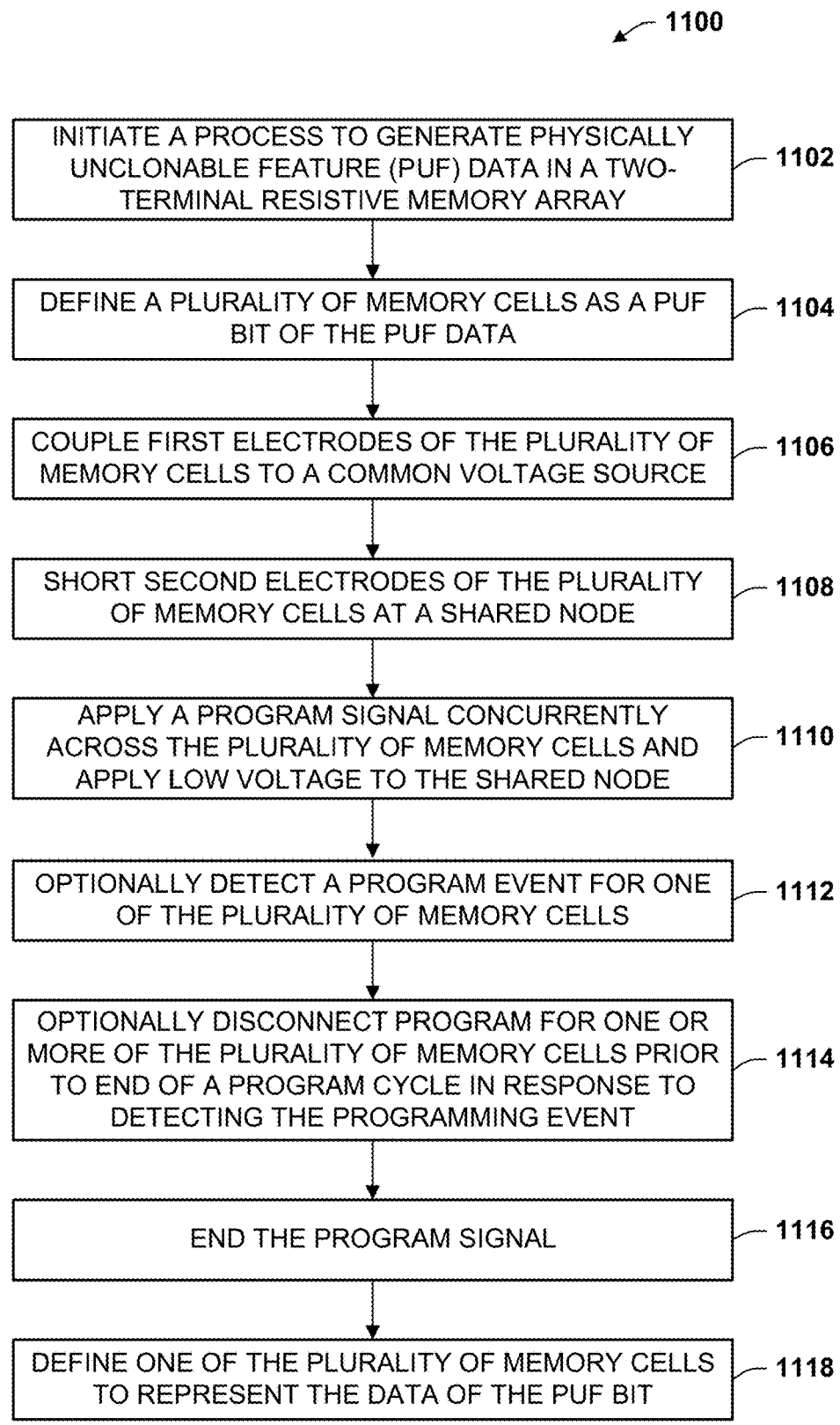
FIG. 11 depicts a sample method for differential programming of an identifier bit with intrinsic program inhibition in further embodiments.

In view of the exemplary diagrams described supra, process methods that can be implemented in accordance with the disclosed subject matter will be better appreciated with reference to the flow charts of FIGS. 9-11. While for purposes of simplicity of explanation, the methods of FIGS. 9-11 are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methods described herein, and in some embodiments additional steps known in the art or reasonably conveyed to one of ordinary skill in the art by way of the context provided herein are also considered within the scope of the present disclosure. Moreover, some steps illustrated as part of one process can be implemented for another process where suitable; other steps of one or more processes can be added or substituted in other processes disclosed herein within the scope of the present disclosure. Additionally, it should be further appreciated that the methods disclosed throughout this specification are capable of being stored on an article of manufacture to facilitate transporting and transferring such methodologies to an electronic device, stored in embedded memory within the electronic device, and so forth. The term article of manufacture, as used, is intended to encompass a computer program accessible from any computer-readable device, device in conjunction with a carrier, or storage medium, or the like.

FIG. 9 depicts a flowchart of a sample method 900 for intrinsic program suppression for differential bit programming of two-terminal resistive switching memory, in one or more disclosed embodiments. At 902, method 900 can comprise identifying multiple two-terminal ReRAM cells for alternate (random) programming (also referred to herein as differential programming). The multiple two-terminal ReRAM cells can be defined as an identifier bit, in one or more embodiments (e.g., a PUF bit, a RNG bit, etc.). At 904, method 900 can comprise clamping respective first electrodes of the multiple ReRAM cells to a voltage source and, at 906, method 900 can comprise electrically shorting respective second electrodes of the multiple ReRAM cells to a common node. Further, at 908, method 900 can comprise concurrently applying a program voltage on the voltage source and connect the common node to low voltage (or ground). In various embodiments, applying the program voltage can comprise applying a program signal having a voltage magnitude and a cycle duration from the voltage source (e.g., a common voltage source) across the respective first electrodes of the plurality of memory cells and applying the low voltage, or ground, to the common node.

At 910, method 900 can optionally comprise detecting a program event of one of the multiple ReRAM cells in response to the program signal, and at 912, method 900 can optionally comprise terminating the program signal in response to detecting the programming event and before expiration of the cycle duration.

At 914, method 900 can comprise ending the alternate programming following completion of the cycle duration. In an embodiment, method 900 can further comprise causing a first of the plurality of memory cells to become programmed to a low resistance state in response to concurrently applying the program signal and applying low voltage, or ground, to the shared node. In a further embodiment, method 900 can further comprise reducing a voltage dropped across a second of the plurality of memory cells due to the program signal, in response to causing the first of the plurality of memory cells to become programmed. In still further embodiments of method 900, reducing the voltage dropped across the second of the multiple ReRAM cells occurs in a response time after causing the first of the plurality of memory cells to become programmed, wherein the response time is selected from a group consisting of: a first range from one to ten nanoseconds and a second range from one to five nanosecond.

In alternative or additional embodiments, method 900 can comprise defining one of the multiple ReRAM memory cells to represent the data of the identifier bit and storing a reference of the definition. Further embodiments of method 900 can comprise reading the identifier bit, comprising: accessing the reference to the definition to identify the one of the plurality of memory cells representing the data of the identifier bit, measuring a resistance state of the one of the plurality of memory cells, and ignoring a second resistance state of a second of the plurality of memory cells.

Figure 10A:
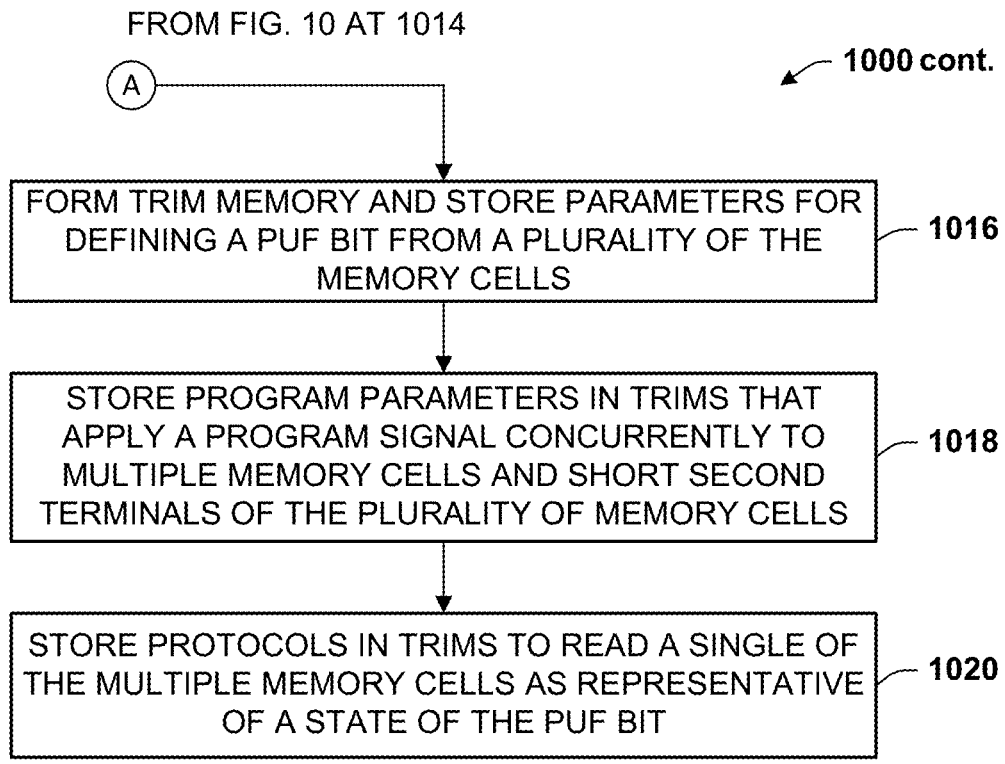

FIGS. 10 and 10A illustrate a method 1000 for fabricating a two-terminal resistive switching array configured for differential program of identifier bits, in further disclosed embodiments. At 1002, method 1000 can comprise forming an array of two-terminal resistive-switching memory cells comprising bitlines connected to first terminals of the memory cells.

Additionally, at 1004, method 1000 can comprise allocating a pair of the bitlines of the array for differential programming, as described herein. At 1006, method 1000 can comprise forming a multiplexer(s) to selectively couple the pair of bitlines to a common voltage source. At 1008, method 1000 can comprise providing a switch to short second terminals of a first two-terminal resistive switching memory having a first terminal connected to a first bitline of the pair of bitlines, and of a second two-terminal resistive switching memory having a first terminal connected to a second bitline of the pair of bitlines.

At 1010, method 1000 can comprise selectively coupling the switch to low voltage, or ground. The switch can be constructed so that, when activated, the shorted second terminals of the first and second two-terminal resistive switching memory cells are coupled to low voltage, or ground. At 1012, method 1000 can optionally comprise forming a program detection circuit configured to detect a program event of the first two-terminal resistive switching memory cell or of the second two-terminal resistive switching memory cell. At 1014, method 1000 can comprise optionally forming a termination circuit configured to selectively isolate the first bitline, the second bitline, or both the first and second bitlines from the common voltage source in response to detection of the program event.

From reference number 1014, method 1000 proceeds at FIG. 10A. At 1016, method 1000 can comprise forming trim memory and storing parameters for defining a PUF bit or a RNG bit from a plurality of the memory cells, including the first two-terminal resistive-switching memory cell and the second two-terminal resistive-switching memory cell. At 1018, method 1000 can comprise storing program parameters in the trim memory that apply a program signal at the common voltage source concurrently to the first bitline and the second bitline and activate the switch to short second terminals of the plurality of memory cells defined for the PUF bit or the RNG bit and connect the shorted second terminals to low voltage, or ground. Additionally, at 1020, method 1000 can comprise storing protocols in trim memory to read a single of the multiple memory cells as representative of a state of the PUF bit, or the RNG bit, defined by the first resistive-switching memory cell and the second-resistive-switching memory cell. Thus, as an example, instead of reading states of both the first two-terminal resistive switching memory cell and the second two-terminal resistive switching memory cell to read the PUF bit or the RNG bit, the protocols can designate a state of a single of the memory cells to store a binary value associated with the PUF bit or the RNG bit. The protocol can provide for reading the single memory cell to read the state of the binary value associated with the PUF bit or the RNG bit.

Referring now to FIG. 11, there is illustrated a method 1100 for generating PUF data by a differential program method, in disclosed embodiments. At 1102, method 1100 can comprise initiating a process to generate physical unclonable feature (PUF) data in a two-terminal resistive memory array. At 1104, method 1100 can comprise defining a plurality of memory cells of the memory array as a PUF bit of the PUF data. At 1106, method 1100 can comprise coupling first electrodes of the plurality of memory cells to a common voltage source. At 1108, method 1100 can comprise shorting second electrodes of the plurality of memory cells at a shared node.

At 1110, method 1100 can comprise applying a program signal concurrently across the plurality of memory cells and apply low voltage to the shared node. At 1112, method 1100 can comprise optionally detecting a program event for one of the plurality of memory cells in response to the program signal and low voltage applied across the memory cells. At 1114, method 1100 can optionally comprise disconnecting the program signal for one or more of the plurality of memory cells prior to end of a program cycle associated with the program signal in response to detecting the program event. At 1116, method 1100 can comprise ending the program signal, and at 1118, method 1100 can comprise defining one of the plurality of memory cells to represent the data of the PUF bit.

In an embodiment, method 1100 can further comprise intrinsically inhibiting the second memory cell from being programmed to a low resistance state in response to causing the first memory cell to become programmed to the low resistance state in response to the program signal. In a further embodiment, intrinsically inhibiting the second memory cell occurs within about 10 nanoseconds following causing the first memory cell to program to the low resistance state. In yet another embodiment, optionally disconnecting the program signal for the one or more of the plurality of memory cells occurs in a range from about 0.5 microseconds to about 1.0 microseconds following optionally detecting the program event.

EXAMPLE OPERATING ENVIRONMENTS

FIG. 12 illustrates a block diagram of an example operating and control environment 1200 for a memory array 1202 of a memory device according to aspects of the subject disclosure. Control environment 1200 and memory array 1202 can be formed within a single semiconductor die in some embodiments, although the subject disclosure is not so limited and in other embodiments some components of control environment 1200 can be formed on a separate semiconductor die. In at least one aspect of the subject disclosure, memory array 1202 can comprise memory selected from a variety of memory cell technologies. In at least one embodiment, memory array 1202 can comprise a two-terminal memory technology, arranged in a compact two or three-dimensional architecture. Suitable two-terminal memory technologies can include resistive-switching memory, conductive-bridging memory, phase-change memory, organic memory, magneto-resistive memory, or the like, or a suitable combination of the foregoing. In a further embodiment, the two-terminal memory technology can be a two-terminal resistive switching technology.

A column controller 1206 and sense amps 1208 can be formed adjacent to memory array 1202. Moreover, column controller 1206 can be configured to activate (or identify for activation) a subset of bit lines of memory array 1202. Column controller 1206 can utilize a control signal(s) provided by a reference and control signal generator(s) 1218 to activate, as well as operate upon, respective ones of the subset of bitlines, applying suitable program, erase or read voltages to those bitlines. Non-activated bitlines can be kept at an inhibit voltage (also applied by reference and control signal generator(s) 1218), to mitigate or avoid bit-disturb effects on these non-activated bitlines.

In addition, operating and control environment 1200 can comprise a row controller 1204. Row controller 1204 can be formed adjacent to and electrically connected with word lines of memory array 1202. Also utilizing control signals of reference and control signal generator(s) 1218, row controller 1204 can select one or more rows of memory cells with a suitable selection voltage. Moreover, row controller 1204 can facilitate program, erase or read operations by applying suitable voltages at selected word lines.

Sense amps 1208 can read data from, or write data to, the activated memory cells of memory array 1202, which are selected by column control 1206 and row control 1204. Data read out from memory array 1202 can be provided to an input/output buffer 1212. Likewise, data to be written to memory array 1202 can be received from the input/output buffer 1212 and written to the activated memory cells of memory array 1202.

A clock source(s) 1210 can provide respective clock pulses to facilitate timing for read, write, and program operations of row controller 1204 and column controller 1206. Clock source(s) 1210 can further facilitate selection of word lines or bit lines in response to external or internal commands received by operating and control environment 1200. Input/output buffer 1212 can comprise a command and address input, as well as a bidirectional data input and output. Instructions are provided over the command and address input, and the data to be written to memory array 1202 as well as data read from memory array 1202 is conveyed on the bidirectional data input and output, facilitating connection to an external host apparatus, such as a computer or other processing device (not depicted, but see e.g., computer 1302 of FIG. 13, infra).

Input/output buffer 1212 can be configured to receive write data, receive an erase instruction, receive a status or maintenance instruction, output readout data, output status information, and receive address data and command data, as well as address data for respective instructions. Address data can be transferred to row controller 1204 and column controller 1206 by an address register 1214. In addition, input data is transmitted to memory array 1202 via signal input lines between sense amps 1208 and input/output buffer 1212, and output data is received from memory array 1202 via signal output lines from sense amps 1208 to input/output buffer 1212. Input data can be received from the host apparatus, and output data can be delivered to the host apparatus via the I/O bus.

Commands received from the host apparatus can be provided to a command interface 1216. Command interface 1216 can be configured to receive external control signals from the host apparatus and determine whether data input to the input/output buffer 1212 is write data, a command, or an address. Input commands can be transferred to a state machine 1220.

State machine 1220 can be configured to manage programming and reprogramming of memory array 1202 (as well as other memory banks of a multi-bank memory array). Instructions provided to state machine 1220 are implemented according to control logic configurations, enabling state machine 1220 to manage read, write, erase, data input, data output, and other functionality associated with memory cell array 1202. In some aspects, state machine 1220 can send and receive acknowledgments and negative acknowledgments regarding successful receipt or execution of various commands. In further embodiments, state machine 1220 can decode and implement status-related commands, decode and implement configuration commands, and so on.

To implement read, write, erase, input, output, etc., functionality, state machine 1220 can control clock source(s) 1210 or reference and control signal generator(s) 1218. Control of clock source(s) 1210 can cause output pulses configured to facilitate row controller 1204 and column controller 1206 implementing the particular functionality. Output pulses can be transferred to selected bit lines by column controller 1206, for instance, or word lines by row controller 1204, for instance.

Figure 13:
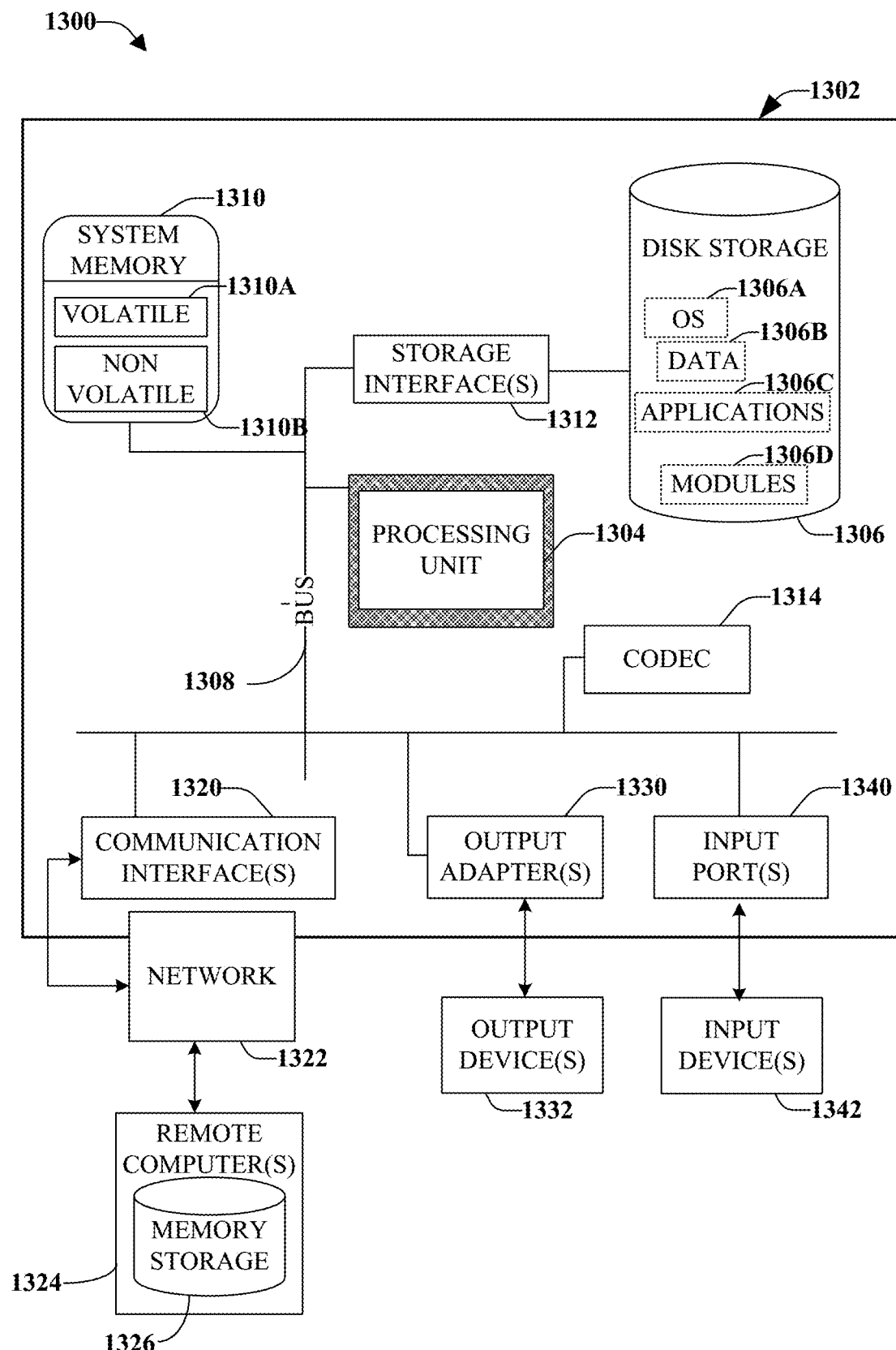
FIG. 13 depicts a block diagram of an example computing environment for implementing one or more disclosed embodiments of the present disclosure.

In connection with FIG. 13, the systems, devices, and/or processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

With reference to FIG. 13, a suitable environment 1300 for implementing various aspects of the claimed subject matter includes a computer 1302. The computer 1302 includes a processing unit 1304, a system memory 1310, a codec 1314, and a system bus 1308. The system bus 1308 couples system components including, but not limited to, the system memory 1310 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1310 includes volatile memory 1310A and non-volatile memory 1310B. The basic input/output system (BIOS), containing the basic routines to transfer information between elements within the computer 1302, such as during start-up, is stored in non-volatile memory 1310B. In addition, according to present innovations, codec 1314 may include at least one of an encoder or decoder, wherein the at least one of an encoder or decoder may consist of hardware, software, or a combination of hardware and software. Although, codec 1314 is depicted as a separate component, codec 1314 may be contained within non-volatile memory 1310B. By way of illustration, and not limitation, non-volatile memory 1310B can include read only memory (ROM), programmable ROM (PROM), electrically programmable ROM (EPROM), electrically erasable programmable ROM (EEPROM), or flash memory, two-terminal memory, and so on. Volatile memory 1310A includes random access memory (RAM), and in some embodiments can embody a cache memory. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1302 may also include removable/non-removable, volatile/non-volatile computer storage medium. FIG. 13 illustrates, for example, disk storage 1306. Disk storage 1306 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1306 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1306 to the system bus 1308, a removable or non-removable interface is typically used, such as storage interface 1312. It is appreciated that storage devices 1306 can store information related to a user. Such information might be stored at or provided to a server or to an application running on a user device. In one embodiment, the user can be notified (e.g., by way of output device(s) 1332) of the types of information that are stored to disk storage 1306 or transmitted to the server or application. The user can be provided the opportunity to opt-in or opt-out of having such information collected and/or shared with the server or application (e.g., by way of input from input device(s) 1342)

It is to be appreciated that FIG. 13 describes software that acts as an intermediary between users and the basic computer resources described in the suitable operating environment 1300. Such software includes an operating system 1306A. Operating system 1306A, which can be stored on disk storage 1306, acts to control and allocate resources of the computer system 1302. Applications 1306C take advantage of the management of resources by operating system 1306A through program modules 1306D, and program data 1306D, such as the boot/shutdown transaction table and the like, stored either in system memory 1310 or on disk storage 1306. It is to be appreciated that the claimed subject matter can be implemented with various operating systems or combinations of operating systems.

A user enters commands or information into the computer 1302 through input device(s) 1342. Input devices 1342 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via input port(s) 1340. Input port(s) 1340 include, for example, a serial port, a parallel port, a game port, and a universal serial bus (USB). Output device(s) 1332 use some of the same type of ports as input device(s) 1342. Thus, for example, a USB port may be used to provide input to computer 1302 and to output information from computer 1302 to an output device 1332. Output adapter 1330 is provided to illustrate that there are some output devices 1332 like monitors, speakers, and printers, among other output devices 1332, which require special adapters. The output adapters 1330 include, by way of illustration and not limitation, video and sound cards that provide a means of connection between the output device 1332 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1324. The remote computer(s) 1324 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1326 is illustrated with remote computer(s) 1324. Remote computer(s) 1324 is logically connected to computer 1302 through a network 1322 and then connected via communication interface(s) 1320. Network 1322 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication interface(s) 1320 refers to the hardware/software employed to connect the network 1322 to the bus 1308. While communication interface(s) 1320 is shown for illustrative clarity inside computer 1302, it can also be external to computer 1302. The hardware/software necessary for connection to the network 1322 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

Moreover, it is to be appreciated that various components described herein can include electrical circuit(s) that can include components and circuitry elements of suitable value in order to implement the embodiments of the subject disclosure. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further embodiments can be envisioned to one of ordinary skill in the art after reading this disclosure. For example, in various embodiments, erase operations may be initiated upon a plurality of ReRAM devices (e.g., 16, 32, etc.) at the same time.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for generating an identifier bit defined by a plurality of resistive switching memory cells, comprising:
   defining a plurality of memory cells as an identifier bit;
   coupling respective first electrodes of the plurality of memory cells to a common voltage source;
   electrically shorting respective second electrodes of the plurality of memory cells to a shared node;
   concurrently applying a program signal having a voltage magnitude and a cycle duration from the common voltage source across the respective first electrodes of the plurality of memory cells and applying low voltage, or ground, to the shared node; and
   terminate the program signal.

2. The method of claim 1, further comprising causing a first of the plurality of memory cells to become programmed to a low resistance state in response to concurrently applying the program signal and applying low voltage, or ground, to the shared node.

3. The method of claim 2, further comprising reducing a voltage dropped across a second of the plurality of memory cells due to the program signal, in response to causing the first of the plurality of memory cells to become programmed.

4. The method of claim 3, wherein reducing the voltage dropped across the second of the plurality of memory cells occurs in a response time after causing the first of the plurality of memory cells to become programmed, wherein the response time is selected from a group consisting of: less than ten nanoseconds and less than five nanoseconds.

5. The method of claim 1, further comprising defining one of the plurality of memory cells to represent the data of the identifier bit and storing a reference of the definition.

6. The method of claim 5, further comprising reading the identifier bit including:
   accessing the reference to the definition to identify the one of the plurality of memory cells representing the data of the identifier bit;
   measuring a resistance state of the one of the plurality of memory cells; and
   ignoring a second resistance state of a second of the plurality of memory cells.

7. The method of claim 1, further comprising detecting a program event associated with one of the plurality of memory cells in response to the program signal.

8. The method of claim 7, wherein terminating the program signal is initiated in response to detecting the program event and before expiration of the cycle duration.

9. A method of programming a bit defined by a pair of two-terminal resistive memory cells, comprising:
   clamp respective first electrodes of the pair of two-terminal resistive memory cells to a voltage source;
   short respective second electrodes of the pair of two-terminal resistive memory cells at a common node;
   initiate a program voltage at the voltage source and connect the common node to a low voltage;
   cause a first memory cell of the pair of two-terminal resistive memory cells to program to a low resistance state; and
   terminate the program voltage.

10. The method of claim 9, further comprising intrinsically inhibiting the second memory cell from being programmed to the low resistance state in response to causing the first memory cell to program to the low resistance state.

11. The method of claim 10, wherein intrinsically inhibiting the second memory cell occurs within about 10 nanoseconds following causing the first memory cell to program to the low resistance state.

12. The method of claim 9, further comprising detecting the programming of the first memory cell utilizing a detection circuit.

13. The method of claim 12, wherein terminating the program voltage is in response to detecting the programming of the first memory cell.

14. The method of claim 13, wherein detecting the programming of the first memory cell and terminating the program voltage occurs in a range from about 0.5 microseconds to about 1.0 microseconds.

15. A memory device, comprising:
    an array of two-terminal resistive switching devices comprising a first switching device connected at a first terminal to a first bitline and a second switching device connected at a second terminal to a second bitline;
    a voltage source;
    a switch for selectively electrically connecting the first bitline and the second bitline in common to the voltage source;
    a common node connected to a second terminal of the first switching device and to a second terminal of the second switching device;
    a switching circuit configured to selectively couple the common node to low voltage, or ground; and
    a trim memory storing a differential program protocol for programming a bit defined by a combination of the first switching device and the second switching device.

16. The memory device of claim 15, wherein the trim memory setting further stores a specification that one of: the first switching device or the second switching device, stores a program state for the bit in response to implementing the differential program protocol.

17. The memory device of claim 15, wherein the bit is a physical unclonable feature (PUF) bit and the differential program protocol is a PUF program protocol.

18. The memory device of claim 15, wherein the differential program protocol comprises:
    activating the switch to electrically connect the first bitline and the second bitline in common to the voltage source;
    applying a program voltage at the voltage source; and
    activating the switching circuit and electrically connecting the common node to low voltage, or ground.

19. The memory device of claim 15, wherein the switching circuit is a transistor, and wherein the memory device further comprises a wordline coupled to a gate of the transistor for activating or deactivating the switching circuit.

20. The memory device of claim 15, further comprising:
- a detection circuit configured to identify a program event for the first switching device or for the second switching device in response to implementing the differential program protocol on the first switching device and the second switching device; and
- a program termination circuit for isolating the voltage source from the first bitline or from the second bitline in response to the detection circuit identifying the program event.

* * * * *